US012305014B2

(12) United States Patent
Tazumi et al.

(10) Patent No.: US 12,305,014 B2
(45) Date of Patent: May 20, 2025

(54) EXPANDED PARTICLES AND EXPANDED MOLDED ARTICLE

(71) Applicant: SEKISUI KASEI CO., LTD., Osaka (JP)

(72) Inventors: Kohei Tazumi, Osaka (JP); Daichi Kageyama, Osaka (JP); Mayumi Ando, Osaka (JP)

(73) Assignee: SEKISUI KASEI CO., LTD., Osaka (JP)

( * ) Notice: Subject to any disclaimer, the term of this patent is extended or adjusted under 35 U.S.C. 154(b) by 744 days.

(21) Appl. No.: 17/278,887

(22) PCT Filed: Sep. 23, 2019

(86) PCT No.: PCT/IB2019/058012
§ 371 (c)(1),
(2) Date: Mar. 23, 2021

(87) PCT Pub. No.: WO2020/065485
PCT Pub. Date: Apr. 2, 2020

(65) Prior Publication Data
US 2022/0010089 A1    Jan. 13, 2022

(30) Foreign Application Priority Data

Sep. 28, 2018  (JP) ................................. 2018-185200
Mar. 26, 2019  (JP) ................................. 2019-058518
(Continued)

(51) Int. Cl.
*C08J 9/18* (2006.01)
*C08J 9/12* (2006.01)
*C08J 9/228* (2006.01)

(52) U.S. Cl.
CPC ................. *C08J 9/18* (2013.01); *C08J 9/228* (2013.01); *C08J 2205/052* (2013.01); *C08J 2369/00* (2013.01)

(58) Field of Classification Search
CPC ........ C08J 9/18; C08J 9/228; C08J 2205/052; C08J 2369/00; C08J 9/00; B29C 44/00
See application file for complete search history.

(56) References Cited

U.S. PATENT DOCUMENTS 6,191,178 B1    2/2001  Shioya et al.
2015/0118481 A1*  4/2015  Kodama ............... C08J 9/0066
                                                    521/140
(Continued)

FOREIGN PATENT DOCUMENTS

JP    H6-080813       3/1994
JP    H11-287277     10/1999
(Continued)

OTHER PUBLICATIONS

Office Action issued in JP Patent Application No. 2019-058518, Sep. 20, 2022, translation.
(Continued)

*Primary Examiner* — Maria V Ewald
*Assistant Examiner* — Daniel P Dillon
(74) *Attorney, Agent, or Firm* — GREENBLUM & BERNSTEIN, P.L.C.

(57) ABSTRACT

The present invention relates to expanded particles and an expanded molded article. More specifically, the present invention relates to expanded particles comprising a polycarbonate-based resin as a base resin, which has a specified cell density X and a specified average cell wall thickness, as well as an expanded molded article. In addition, the present invention relates to expanded particles comprising a polycarbonate-based resin as a base resin, which has a specified
(Continued)

bulk ratio and a specified average cell diameter, as well as an expanded molded article.

13 Claims, 5 Drawing Sheets

(30) Foreign Application Priority Data

| Mar. 28, 2019 | (JP) | ................................ 2019-064060 |
| Mar. 29, 2019 | (JP) | ................................ 2019-067036 |
| Jul. 31, 2019 | (JP) | ................................ 2019-141409 |

(56) References Cited

U.S. PATENT DOCUMENTS

| 2017/0121481 A1* | 5/2017 | Hatanaka | ............... C08J 9/0061 |
| 2019/0248978 A1* | 8/2019 | Gondoh | ................ C08G 64/06 |

FOREIGN PATENT DOCUMENTS

| JP | H11-349724 | | 12/1999 | |
| JP | 2004-067945 | | 3/2004 | |
| JP | 2016-113548 | | 6/2016 | |
| JP | 2016-125041 | | 7/2016 | |
| JP | 2016-188320 | | 11/2016 | |
| JP | 2016-188321 | | 11/2016 | |
| JP | 2016-188341 | | 11/2016 | |
| JP | 2018-021165 | A | 2/2018 | |
| JP | 2018-024862 | A | 2/2018 | |
| JP | 2018-100380 | | 6/2018 | |
| WO | 2018/047316 | | 3/2018 | |
| WO | WO-2018047316 | A1 * | 3/2018 | ............. C08G 64/06 |
| WO | 2019/189635 | | 10/2019 | |

OTHER PUBLICATIONS

Office Action issued in JP Patent Application No. 2019-064060, Sep. 20, 2022, translation.
Office Action issued in JP Patent Application No. 2019-141409, Sep. 20, 2022, translation.
Notice of Allowance issued in CN Patent Application No. 201980061445.1, Nov. 30, 2022, translation.
Notice of Allowance issued in JP Patent Application No. 2019-058518, Apr. 4, 2023, translation.
Notice of Allowance issued in JP Patent Application No. 2019-064060, Apr. 4, 2023, translation.
Notice of Allowance issued in JP Patent Application No. 2019-141409, Apr. 25, 2023, translation.
Office Action issued in EP Patent Application No. 19866572.1, Jun. 13, 2023.
Extended European Search Report for European Patent Application No. 19866572.1 dated May 9, 2022.
Office Action for Chinese Patent Application No. 201980061445.1 dated Jul. 6, 2022 and English translation.
Partial European Search Report for European Patent Application No. 19866572.1 dated Dec. 21, 2021.
International Search Report dated Dec. 17, 2019 for PCT/IB2019/058012 and English translation thereof.
Written Opinion of the International Searching Authority dated Dec. 17, 2019 for PCT/IB2019/058012 and English translation thereof.
Office Action for Taiwan Patent Application No. 108134239 dated Nov. 3, 2020 and English summary thereof.
Notice of Allowance for Taiwan Patent Application No. 108134239 dated Feb. 26, 2021 and English summary thereof.
Notice of Allowance issued in European Patent Application No. 19866572.1, Dec. 15, 2023.

* cited by examiner

EXPANDED PARTICLES AND EXPANDED MOLDED ARTICLE

CROSS REFERENCE TO RELATED APPLICATION

This Application is a 371 of PCT/IB2019/058012 filed on Sep. 23, 2019, which, in turn, claimed the priorities of Japanese Patent Application No. 2018-185200 filed on Sep. 28, 2018, Japanese Patent Application No. 2019-058518 filed on Mar. 26, 2019, Japanese Patent Application No. 2019-064060 filed on Mar. 28, 2019, Japanese Patent Application No. 2019-067036 filed on Mar. 29, 2019, and Japanese Patent Application No. 2019-141409 filed on Jul. 31, 2019, the contents of which are incorporated herein by reference.

TECHNICAL FIELD

The present invention relates to expanded particles and an expanded molded article. More particularly, the present invention relates to an expanded molded article comprising a polycarbonate-based resin as a base resin, and having a good appearance and a high mechanical strength, a variation of a mechanical strength of which is suppressed from a low temperature to a high temperature, as well as expanded particles from which the expanded molded article can be produced with good moldability.

BACKGROUND TECHNOLOGY

Since an expanded molded article is good in processability and shape retainability, and has a relatively high strength, in addition to being light, it is used in various fields such as a building material, a civil engineering material, and lighting equipment, including a food tray and an automobile member. In particular, when heat resistance is not required, an expanded molded article made of a polystyrene-based resin tends to be used, and when buffering property, restorability, softness, and the like are necessary, an expanded molded article made of an olefin-based resin such as polypropylene and polyethylene tends to be used.

As a resin that has generally heat resistance higher than that of these polystyrene-based resin and olefin-based resin, there is a polycarbonate-based resin. This is a resin material that can also be utilized in places of severe weather such as an arid zone and a tropical zone. This polycarbonate-based resin is not only excellent in heat resistance, but also excellent in water resistance, electric property, mechanical strength, aging resistance, and chemical resistance. For that reason, the polycarbonate-based resin has previously been used as an interior material of a building, and in recent years, use development towards an automobile member, a packaging material, various containers or the like, utilizing excellent properties thereof is also expected.

Meanwhile, as a method of producing an expanded molded article of a polycarbonate-based resin, for example, an in-die expansion molding method of expanding and fusing expanded particles in a die is known. In this method, by preparing a die having a space corresponding to a desired shape, filling expanded particles into the space, and expanding and fusing the expanded particles by heating, an expanded molded article having a complicated shape can be obtained. However, in this method, there has been a problem that an appearance of the expanded molded article is not good, and fusion between expanded particles is also not sufficient.

Therefore, the applicant of the present application has proposed the technique of providing an expanded molded article having a good appearance, by improving fusibility between expanded particles (see Patent Document 1).

In addition, as an expanded molded article by an in-die expansion molding method, one comprising a polystyrene-based resin as a base resin (for example, see Patent Document 2), and one comprising a polyolefin-based resin as a base resin (for example, see Patent Document 3), and the like are known.

DOCUMENTS OF RELATED ART

Patent Documents

Patent Document 1: Japanese Unexamined Patent Application, First Publication No. 2016-188321
Patent Document 2: Japanese Unexamined Patent Application, First Publication No. 2018-100380
Patent Document 3: Japanese Unexamined Patent Application, First Publication No. H11-349724

SUMMARY OF THE INVENTION

Problem to be Solved by the Invention

In Patent Document 1, the expanded molded article having a good appearance is obtained, but provision of an expanded molded article having a further good appearance and a higher mechanical strength by further improving fusibility between expanded particles has been desired.

In addition, the expanded molded article comprising a polystyrene-based resin or a polyolefin-based resin as a base resin has a good mechanical strength around an ambient temperature (about 23° C.), but under the environment of a lower temperature or a higher temperature, a mechanical strength is sometimes reduced. For that reason, provision of an expanded molded article, a variation of a mechanical strength of which is suppressed even when an environmental temperature changes, has been desired.

Means for Solving the Problem

In view of the above-mentioned problems, the present inventors have studied a polycarbonate-based resin to be used, and as a result, unexpectedly found out that by regulating a cell density X and an average cell wall thickness of expanded particles to specified ranges, an appearance and a mechanical strength of an expanded molded article obtained from expanded particles can be good, and at the same time, fusibility between expanded particles can be improved, leading to the present invention.

Thus, according to the present invention, there is provided expanded particles comprising a polycarbonate-based resin as a base resin,
wherein the expanded particles have
(i) a cell density X of $1.0 \times 10^6$ pieces/cm$^3$ or more and less than $1.0 \times 10^8$ pieces/cm$^3$
[a cell density X is calculated by the following expression:

$$\text{cell density } X = (\rho/D - 1)/\{(4/3) \cdot \pi \cdot (C/10000/2)^3\}$$

(wherein C represents an average cell diameter (μm), ρ represents the density (kg/m$^3$) of a polycarbonate-based resin, and D represents an apparent density (kg/m$^3$) of expanded particles)], and (ii) an average cell wall thickness of 1 to 15 μm (hereinafter, sometimes referred to as "first expanded particles").

In addition, the present inventors have unexpectedly found out that by regulating a bulk ratio and an average cell diameter of expanded particles to specified ranges, an appearance and a mechanical strength of an expanded molded article obtained from expanded particles can be good, and at the same time, fusibility between expanded particles can be improved.

Thus, according to the present invention, there is provided expanded particles comprising a polycarbonate-based resin as a base resin, wherein when an average cell diameter of the expanded particles is divided by a bulk ratio of the expanded particles, the expanded particles have a value within a range of 2.5 to 12 μm/times (hereinafter, sometimes referred to as "second expanded particles").

Furthermore, according to the present invention, there is provided an expanded molded article obtained from the expanded particles.

In addition, there is provided an expanded molded article obtained from a plurality of expanded particles comprising a polycarbonate-based resin as a base resin, wherein when a value of a maximum point stress of a bending test at four points is measured at each temperature of −40° C., 23° C., 80° C., and 140° C., and an average of the value of a maximum point stress of a bending test at four points is calculated, the expanded molded article shows a variability rate of the value of a maximum point stress of a bending test at four points to the average within a range of 0 to 50%.

Effects of Invention

According to the present invention, there can be provided an expanded molded article comprising a polycarbonate-based resin as a base resin, which is good in an appearance and a mechanical strength, and has improved fusibility, as well as expanded particles of a polycarbonate-based resin, from which an expanded molded article can be produced with good moldability.

In addition, in any of the following cases, there can be provided an expanded molded article comprising a polycarbonate-based resin as a base resin, which has better appearance and mechanical strength, and has further improved fusibility, and expanded particles of a polycarbonate-based resin, from which an expanded molded article can be produced with better moldability.

(1) The expanded particles have an apparent density of 20 to 640 kg/m$^3$.

(2) The average cell diameter is 20 to 200 μm, and the density of the polycarbonate-based resin is $1.0 \times 10^3$ to $1.4 \times 10^3$ kg/m$^3$.

(3) The expanded particles show a cell number density of $1.0 \times 10^7$ to $1.0 \times 10^9$ pieces/cm$^3$.

(4) The expanded particles have a bulk ratio of 2 to 20 times.

(5) The expanded particles have an open cell rate of 0 to 10%.

Furthermore, according to the present invention, there can be provided an expanded molded article, a variation of a mechanical strength of which is suppressed even when an environmental temperature changes.

In addition, in any of the following cases, there can be provided an expanded molded article, a variation of a mechanical strength of which is further suppressed even when an environmental temperature changes.

(1) The expanded molded article has an open cell rate of 0 to 50%.

(2) The expanded molded article has an expansion ratio of 3 to 30 times.

(3) When "maximum point stress of bending test/density" at four points is calculated by dividing values of four points of a maximum point stress of a bending test by the density of the expended molded article, respectively, and an average of the "maximum point stress of bending test/density" at four points is calculated, the expanded molded article shows a variability rate of the value of "maximum point stress of bending test/density" at four points to the average within a range of 0 to 50%.

(4) The polycarbonate-based resin shows MFR of 1.0 to 15.0 g/10 min.

(5) The "maximum point stress of bending test" at −40° C. changes within a range of 0 to 0.88, to the "maximum point stress of bending test" at 23° C.

BRIEF DESCRIPTION OF THE DRAWINGS

FIG. 1 is a photograph of cut sections of expanded particles and an expanded molded article of Examples 1a to 3a.

FIG. 2 is a photograph of cut sections of expanded particles and an expanded molded article of Examples 4a to 6a.

FIG. 3 is a photograph of cut sections of expanded particles and an expanded molded article of Comparative Examples 1a to 3a.

BEST MODE FOR CARRYING OUT THE INVENTION

1. Expanded Particles

Figure 1:
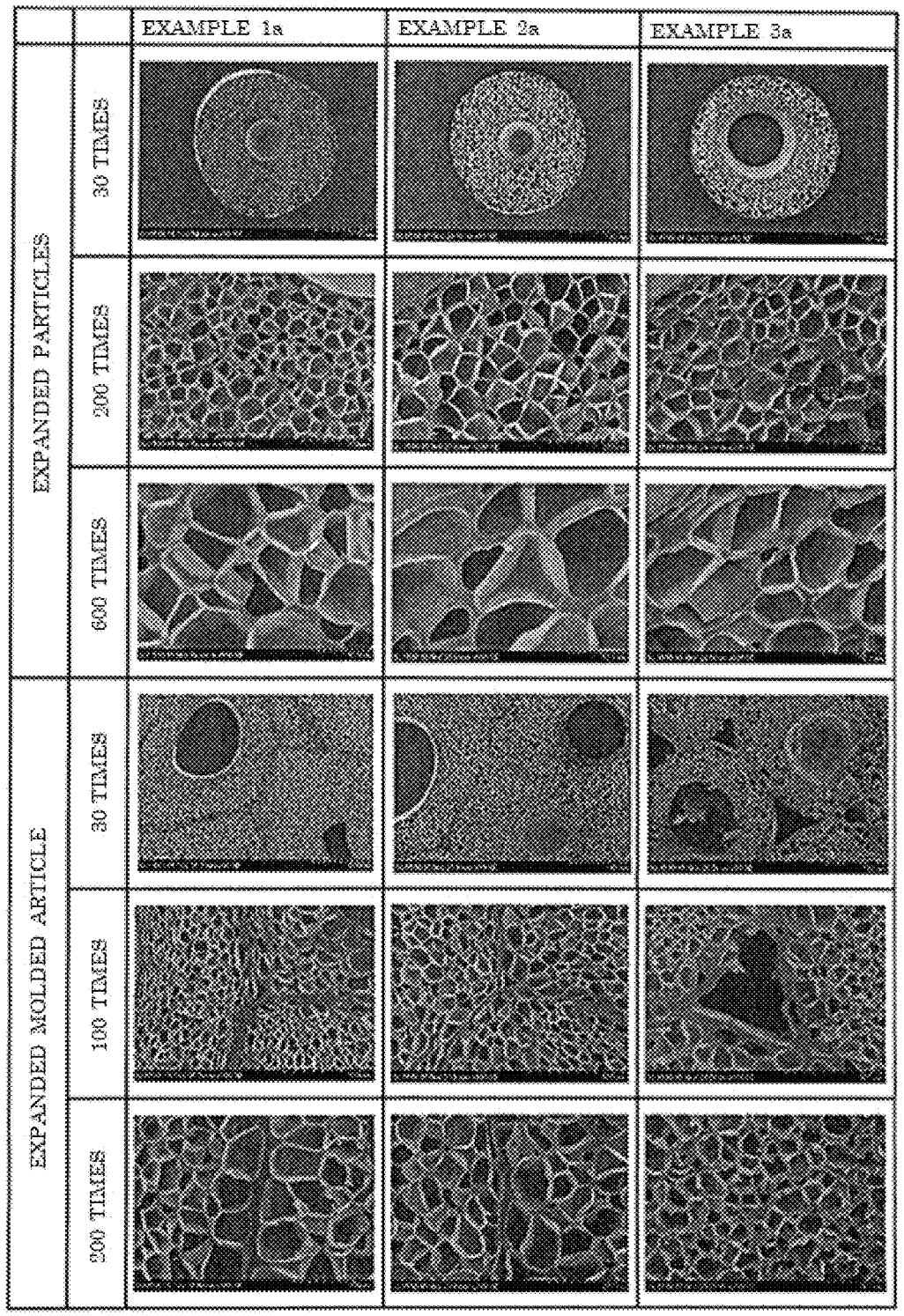

The expanded particles of the present invention include first expanded particles and second expanded particles. In the present specification, the above-mentioned first expanded particles and second expanded particles are sometimes simply referred to as "expanded particles".

First, the first expanded particles in the present invention comprise a polycarbonate-based resin as a base resin, and have a specified cell density X and a specified average cell wall thickness. The present inventors have found out that by adjusting a cell density X and an average cell wall thickness, an appearance and a mechanical strength of an expanded molded article can be good, and at the same time, fusibility between expanded particles can be further improved.

In addition, the second expanded particles in the present invention comprise a polycarbonate-based resin as a base resin, and have a specified bulk ratio and a specified average cell diameter. The present inventors have found out that by adjusting a bulk ratio and an average cell diameter, an appearance and a mechanical strength of an expanded molded article can be good, and at the same time, fusibility between expanded particles can be further improved.

1-1. Cell Density X

A cell density X can be $1.0 \times 10^6$ pieces/cm³ or more and less than $1.0 \times 10^8$ pieces/cm³. When the cell density X is less than $1.0 \times 10^6$ pieces/cm³, increase in an expansion ratio may become difficult. When the cell density X is $1.0 \times 10^8$ pieces/cm³ or more, a cell wall thickness becomes small, and moldability may become deteriorated. A preferable cell density X is $2.0 \times 10^6$ pieces/cm³ or more and less than $1.0 \times 10^8$ pieces/cm³, and a more preferable cell density X is $5.0 \times 10^6$ pieces/cm³ to $8.0 \times 10^7$ pieces/cm³.

Herein, the cell density X can be calculated by the following expression:

$$\text{cell density } X = (\rho/D - 1)/\{(4/3) \cdot \pi \cdot (C/10000/2)^3\}.$$

In the expression, C represents an average cell diameter (mm), ρ represents the density (kg/m³) of a polycarbonate-based resin, and D represents an apparent density (kg/m³) of expanded particles.

It is preferable that the average cell diameter C is in a range of 20 to 200 μm. A more preferable average cell diameter C is 40 to 180 μm, and a further preferable cell diameter C is 50 to 150 μm.

It is preferable that the density ρ of the polycarbonate-based resin is in a range of $1.0 \times 10^3$ to $1.4 \times 10^3$ kg/m³. When the density ρ is less than $1.0 \times 10^3$ kg/m³, a heat resisting temperature may be reduced. When the density ρ is greater than $1.4 \times 10^3$ kg/m³, a heat resisting temperature rises, and expansion molding may become difficult. A more preferable density ρ is $1.10 \times 10^3$ to $1.35 \times 10^3$ kg/m³, and a further preferable density ρ is $1.15 \times 10^3$ to $1.30 \times 10^3$ kg/m³.

It is preferable that an apparent density D of the expanded particles is in a range of 20 to 640 kg/m³. When the apparent density D is less than 20 kg/m³, a cell film becomes thin, the cell film breaks at molding, a ratio of an open cell increases, and shrinkage and the like of the expanded particles due to buckling of a cell may be generated. When the apparent density D is greater than 640 kg/m³, a cell film becomes thick, and moldability may be reduced. A more preferable apparent density D is 40 to 400 kg/m³, and a further preferable apparent density D is 50 to 200 kg/m³.

In addition, it is preferable that a bulk density of the expanded particles is in a range of 12 to 600 kg/m³. When the bulk density is less than 12 kg/m³, a cell film becomes thin, the cell film breaks at molding, a ratio of an open cell increases, and shrinkage and the like of the expanded particles due to buckling of a cell may be generated. When the bulk density is greater than 600 kg/m³, a cell film becomes thick, and moldability may be reduced. A more preferable bulk density is 24 to 240 kg/m³, and a further preferable bulk density is 30 to 120 kg/m³.

1-2. Average Cell Wall Thickness

An average cell wall thickness can be 1 to 15 μm. When the average cell wall thickness is less than 1 μm, moldability at molding, particularly fusion may be deteriorated. When the average cell wall thickness is greater than 15 μm, increase in an expansion ratio may become difficult. A preferable average cell wall thickness is 1 to 10 μm, and a more preferable average cell wall thickness is 1 to 5 μm.

1-3. Value Obtained by Dividing Average Cell Diameter of Expanded Particles by Bulk Ratio of Expanded Particles A value obtained by dividing an average cell diameter of expanded particles by a bulk ratio of expanded particles shows a value within a range of 2.5 to 12 μm/times. When the value is less than 2.5 μm/times, a cell film becomes thin, the cell film breaks at molding, a ratio of an open cell increases, and shrinkage and the like of the expanded particles due to buckling of a cell may be generated. When the value is greater than 12 μm/times, a cell film becomes thick, and moldability may be reduced. The value is preferably 3.0 to 10.0 μm/times, more preferably 3.0 to 6.5 μm/times.

It is preferable that the bulk ratio is in a range of 2 to 20 times. When the bulk ratio is less than 2 times, a cell film becomes thick, and moldability may be reduced. When the bulk ratio is greater than 20 times, a cell film becomes thin, the cell film breaks at molding, a ratio of an open cell increases, and shrinkage and the like of the expanded particles due to buckling of a cell may be generated. The bulk ratio is more preferably 3 to 18 times, further preferably 5 to 16 times.

It is preferable that the average cell diameter is in a range of 20 to 200 μm. When the average cell diameter is less than 20 μm, a cell film becomes thin, and the cell film breaks at molding, a ratio of an open cell increases, and shrinkage and the like of the expanded particles due to buckling of a cell may be generated. When the average cell diameter is greater than 200 μm, a cell film becomes thick, and moldability may be reduced. The average cell diameter is more preferably 20 to 150 μm, further preferably 30 to 120 μm.

1-4. Cell Number Density

It is preferable that a cell number density shows $1.0 \times 10^7$ to $1.0 \times 10^9$ pieces/cm³. When the cell number density is less than $1.0 \times 10^7$ pieces/cm³, increase in an expansion ratio may become difficult. When the cell number density is $1.0 \times 10^9$ pieces/cm³ or more, a cell wall thickness becomes small, and moldability may be deteriorated. The cell number density is more preferably $3.0 \times 10^7$ to $5.0 \times 10^8$ pieces/cm³.

Herein, the cell number density can be calculated by the following expression:

$$\text{cell number density} = (\rho/D - 1)/\{(4/3) \cdot \pi \cdot (C/10000/2)^3\}.$$

In the expression, C represents an average cell diameter (mm), ρ represents the density (kg/m³) of a polycarbonate-based resin, and D represents an apparent density (kg/m³) of expanded particles.

It is preferable that the average cell diameter C is in the above-mentioned range of 20 to 200 μm.

It is preferable that the density ρ of a polycarbonate-based resin is in a range of $1.0 \times 10^3$ to $1.4 \times 10^3$ kg/m³. When the density ρ is less than $1.0 \times 10^3$ kg/m³, a heat resisting temperature may be reduced. When the density ρ is greater than $1.4 \times 10^3$ kg/m³, a heat resisting temperature rises, and expansion molding may become difficult. The density ρ is more preferably $1.10 \times 10^3$ to $1.35 \times 10^3$ kg/m³, further preferably $1.15 \times 10^3$ to $1.30 \times 10^3$ kg/m³.

It is preferable that an apparent density D of the expanded particles is in a range of 20 to 640 kg/m³. When the apparent density D is less than 20 kg/m³, a cell film becomes thin, the cell film breaks at molding, a ratio of an open cell increases, and shrinkage and the like of the expanded particles due to buckling of a cell may be generated. When the apparent density D is greater than 640 kg/m³, a cell film becomes thick, and moldability may be reduced. The apparent density D is more preferably 40 to 400 kg/m³, further preferably 50 to 250 kg/m³.

It is preferable that an average cell wall thickness is in a range of 1 to 15 μm. When the average cell wall thickness is less than 1 μm, moldability at molding, particularly fusion may be deteriorated. When the average cell wall thickness is greater than 15 μm, increase in an expansion ratio may become difficult. The average cell wall thickness is more preferably 1 to 10 μm, further preferably 1 to 5 μm.

1-5. Open Cell Rate

It is preferable that an open cell rate is 0 to 10%. When the open cell rate is greater than 10%, moldability of the expanded molded article may be reduced. It is more preferable that the open cell rate is 0 to 5%.

1-6. Polycarbonate-Based Resin

A polycarbonate-based resin that becomes a base resin of the expanded particles may be a straight polycarbonate-based resin, or may be a branched polycarbonate-based resin.

It is preferable that the polycarbonate-based resin has a polyester structure of a carbonic acid, and a glycol or a dihydric phenol. The polycarbonate-based resin may have an aliphatic skeleton, an alicyclic skeleton, an aromatic skeleton or the like. From a view point that heat resistance is further enhanced, it is preferable that the polycarbonate-based resin has an aromatic skeleton. Examples of the polycarbonate-based resin include polycarbonate resins derived from bisphenol, such as 2,2-bis(4-oxyphenyl)propane, 2,2-bis(4-oxyphenyl)butane, 1,1-bis(4-oxyphenyl)cyclohexane, 1,1-bis(4-oxyphenyl)butane, 1,1-bis(4-oxyphenyl)isobutane, and 1,1-bis(4-oxyphenyl)ethane, and the like.

The polycarbonate-based resin may contain resins other than a polycarbonate resin. Examples of other resins include an acrylic-based resin, a saturated polyester-based resin, an ABS-based resin, a polystyrene-based resin, a polyolefin-based resin, a polyphenylene oxide-based resin, and the like. It is preferable that the polycarbonate-based resin contains 50% by weight or more of the above-mentioned polycarbonate resin.

In addition, the polycarbonate-based resin has MFR of preferably 1.0 to 20.0 g/10 min, more preferably 2.0 to 15.0 g/10 min. Resins in this range are suitable for expansion, and more easily cause high expansion. Furthermore, the polycarbonate-based resin has MFR of preferably 1.0 to 15.0 g/10 min, more preferably 1.0 to 14.0 g/10 min, further preferably 1.0 to 12.0 g/10 min. Resins in this range can suitably realize a variability rate X of the expanded molded article, described later.

1-7. Shape of Expanded Particles

A shape of the expanded particles is not particularly limited. Examples thereof include a spherical shape, a cylindrical shape, and the like. It is preferable that, among them, the shape is as close to a spherical shape as possible. That is, it is preferable that a ratio of a short diameter and a long diameter of the expanded particles is as close to 1 as possible.

It is preferable that the expanded particles have an average particle diameter of 1 to 20 mm. The average particle diameter is a value expressed by D50, obtained by classification using a Ro-Tap type sieve shaker.

1-8. Method of Producing Expanded Particles

Expanded particles can be obtained by impregnating a blowing agent into resin particles to obtain expandable particles, and expanding the expandable particles.

1-8-1. Production of Expandable Particles

Expandable particles can be obtained by impregnating a blowing agent into resin particles made of a polycarbonate-based resin.

The resin particles can be obtained by the known method. Examples thereof include a method of granulation by melting and kneading a polycarbonate-based resin together with other additives as necessary in an extruder, and extruding the kneaded product to obtain a strand, and cutting the resulting strand in the air, in water, and while heating. As the resin particles, commercially available resin particles may be used. If necessary, additives other than the resin may be contained in the resin particles. Examples of other additives include a plasticizer, a flame retardant, a flame retardant aid, an antistatic agent, a spreading agent, a cell adjusting agent, a filler, a colorant, a weather-resistant agent, an aging preventing agent, an antioxidant, an ultraviolet absorbing agent, a lubricant, an antifogging agent, a perfume, and the like.

Next, as the blowing agent to be impregnated into the resin particles, the known volatile blowing agent or inorganic blowing agent can be used. Examples of the volatile blowing agent include an aliphatic hydrocarbon such as propane, butane, and pentane, an aromatic hydrocarbon, an alicyclic hydrocarbon, an aliphatic alcohol, and the like. Examples of the inorganic blowing agent include a carbonic acid gas, a nitrogen gas, the air, an inert gas (helium, argon, and the like), and the like. Two or more kinds of these blowing agents may be used together. Among these blowing agents, the inorganic blowing agent is preferable, and a carbonic acid gas is more preferable.

It is preferable that the content (impregnation amount) of the blowing agent is 3 to 15 parts by weight, based on 100 parts by weight of the polycarbonate-based resin. When the content of the blowing agent is less than 3 parts by weight, an expanding power becomes low, and good expansion may be difficult. When the content exceeds 15 parts by weight, the plasticizing effect becomes great, shrinkage easily occurs at expansion, the productivity may be deteriorated, and at the same time, it may become difficult to stably obtain a desired expansion ratio. The more preferable content of the blowing agent is 4 to 12 parts by weight.

Examples of an impregnation method include a wet-type impregnation method of dispersing resin particles in a water system, and pressing a blowing agent therein while stirring, to thereby impregnate the blowing agent, a dry-type impregnation method substantially not using water (gaseous phase impregnation method), of placing the resin particles into a sealable container, and pressing a blowing agent therein to impregnate the blowing agent, and the like. In particular, a dry-type impregnation method by which impregnation can be performed without using water is preferable. An impregnation pressure, an impregnation time, and an impregnation temperature when the blowing agent is impregnated into the resin particles are not particularly limited.

From a view point that impregnation is effectively performed, and further good expanded particles and expanded molded article are obtained, it is preferable that an impregnation pressure is 0.5 to 10 MPa (gauge pressure). 1 to 4.5 MPa (gauge pressure) is more preferable.

It is preferable that an impregnation time is 0.5 to 200 hours. When the impregnation time is shorter than 0.5 hours, since an impregnation amount of the blowing agent into the resin particles is reduced, it may difficult to obtain a sufficient expanding powder. When the impregnation time is longer than 200 hours, the productivity may be reduced. A more preferable impregnation time is 1 to 100 hours.

It is preferable that an impregnation temperature is 0 to 60° C. When an impregnation temperature is lower than 0° C., solubility of the blowing agent in the resin is enhanced, and a more than necessary blowing agent is impregnated. In addition, diffusing property of the blowing agent in the resin is deteriorated. Hence, it may be difficult to obtain a sufficient expanding power (primary expanding power) in a desired time. When the impregnation temperature is higher than 60° C., solubility of the blowing agent in the resin is reduced, and an impregnation amount of the blowing agent is reduced. In addition, diffusing property of the blowing agent in the resin is enhanced. Hence, it may be difficult to obtain a sufficient expanding power (primary expanding power) in a desired time. A more preferable impregnation temperature is 5 to 50° C.

A surface treating agent such as a bonding preventing agent (coalescence preventing agent), an antistatic agent, and a spreading agent may be added to an impregnation product.

The bonding preventing agent has a function of preventing coalescence between expanded particles. Herein, coalescence refers to unification and integration of a plurality of expanded particles. Specific examples of the bonding preventing agent include talc, calcium carbonate, aluminum hydroxide, and the like.

Examples of the antistatic agent include polyoxyethylene alkyl phenol ether, stearic acid monoglyceride, and the like.

Examples of the spreading agent include polybutene, polyethylene glycol, silicone oil, and the like.

1-8-2. Production of Expanded Particles

As a method of expanding expandable particles to obtain expanded particles (primary expanded particles), there is a method of heating expandable particles with the hot air, a heat medium such as oil, steam (water steam) or the like to expand it. In order to stably produce expanded particles, steam is preferable.

It is preferable that a sealed pressure-resistant expansion container is used in an expanding machine at expansion. In addition, a pressure of steam is preferably 0.10 to 0.80 MPa (gauge pressure), more preferably 0.25 to 0.45 MPa (gauge pressure). An expansion time is enough if it is a necessary time for obtaining a desired expansion ratio. A preferable expansion time is 5 to 180 seconds. When the expansion time exceeds 180 seconds, shrinkage of the expanded particles may begin, and from such expanded particles, an expanded molded article having good physical properties may not be obtained.

The above-mentioned bonding preventing agent may be removed before molding. As a removing method, it is preferable to perform washing using water, or an acidic aqueous solution such as hydrochloric acid.

1-8-3. Adjustment of Cell Density X and Average Cell Wall Thickness

By adjusting impregnation conditions (impregnation pressure, impregnation time, impregnation temperature) and primary expansion conditions (expansion pressure, expansion time) of the above-mentioned steps of producing expanded particles, a cell density X and an average cell wall thickness can be large or small.

1-8-4. Adjustment of Bulk Ratio and Average Cell Diameter

By adjusting impregnation conditions (impregnation pressure, impregnation time, impregnation temperature) and primary expansion conditions (expansion pressure, expansion time) of the above-mentioned steps of producing expanded particles, a bulk ratio and an average cell diameter can be large or small.

2. Expanded Molded Article

An expanded molded article is obtained from a plurality of expanded particles comprising a polycarbonate-based resin as a base resin. Herein, it is preferable that expanded particles are any one selected from the group consisting of the above-mentioned first expanded particles and second expanded particles.

2-1. Cell Density X

A cell density X is calculated from expanded particles constituting an expanded molded article. The cell density X can be calculated from the following expression:

$$\text{cell density } X = (\rho/D - 1)/\{(4/3) \cdot \pi \cdot (C/10000/2)^3\},$$

in the same manner as the above-mentioned expanded particles. Herein, D is the density of an expanded molded article.

The cell density X can be $1.0 \times 10^6$ pieces/cm$^3$ or more and less than $1.0 \times 10^8$ pieces/cm$^3$. The reason why the cell density X was in a specified range is the same as the reason for the above-mentioned expanded particles. A preferable range and a more preferable range of the cell density X are the same as each of those for the above-mentioned expanded particles.

Furthermore, a preferable range, the reason why the range was selected, a more preferable range, and a further preferable range of each of an average cell diameter C and the density $\rho$ of a polycarbonate-based resin are the same as each of those for the above-mentioned expanded particles.

It is preferable that density D of the expanded molded article is in a range of 12 to 600 kg/m$^3$. When the density D is less than 12 kg/m$^3$, a cell film becomes thin, the cell film breaks at molding, a ratio of an open cell increases, and this may lead to deterioration of the strength as a molded article. When the density D is greater than 600 kg/m$^3$, a cell film becomes thick, and moldability may be reduced. A more preferable density D is 24 to 240 kg/m$^3$, and a further preferable density D is 30 to 120 kg/m$^3$.

2-2. Average Cell Wall Thickness

An average cell wall thickness can be 1 to 15 μm. The reason why the average cell wall thickness was in a specified range is the same as the reason for the above-mentioned expanded particles. A preferable range and a more preferable range of the average cell wall thickness are the same as each of those for the above-mentioned expanded particles.

2-3. Value Obtained by Dividing Average Cell Diameter of Expanded Molded Article by Ratio of Expanded Molded Article A value obtained by dividing an average cell diameter of an expanded molded article by a ratio of an expanded molded article shows a value within a range of 2.5 to 12 μm/times. When the value is less than 2.5 μm/times, a cell film becomes thin, shrinkage and the like of expanded particles due to buckling of a cell are generated, and as a result, a mechanical strength of an expanded molded article may be reduced. When the value is greater than 12 μm/times, a cell film becomes thick, moldability is reduced, and as a result, a mechanical strength of an expanded molded article may be reduced. The value is preferably 3.0 to 10.0 μm/times, more preferably 3.0 to 6.5 μm/times.

It is preferable that the ratio is in a range of 2 to 20 times. When the ratio is less than 2 times, a cell film becomes thick, and moldability may be reduced, or fusibility between expanded particles at molding may be reduced. When the ratio is greater than 20 times, a cell film becomes thin, the cell film breaks at molding, a ratio of an open cell increases, and this may lead to deterioration of the strength as a molded article. The ratio is more preferably 3 to 18 times, further preferably 5 to 16 times.

2-4. Cell Number Density

A cell number density X is calculated from expanded particles constituting an expanded molded article. The cell number density can be calculated from the following expression:

$$\text{cell number density} = (\rho/D - 1)/\{(4/3) \cdot \pi \cdot (C/10000/2)^3\},$$

in the same manner as the above-mentioned expanded particles. Herein, D is the density of an expanded molded article.

It is preferable that the cell number density X shows $1.0 \times 10^7$ to $1.0 \times 10^9$ pieces/cm$^3$. When the cell number density is out of the above-mentioned specified range, moldability may be deteriorated, and a mechanical strength may be reduced. A preferable range and a more preferable range of the cell number density are the same as each of those for the above-mentioned expanded particles.

Furthermore, a preferable range, the reason why the range was selected, a more preferable range, and a further preferable range of each of an average cell diameter C and the density ρ of a polycarbonate-based resin are the same as each of those for the above-mentioned expanded particles.

It is preferable that the density D of the expanded molded article is in a range of 12 to 600 kg/m$^3$. When the density D is less than 12 kg/m$^3$, a cell film becomes thin, the film breaks at molding, a ratio of an open cell increases, and this may lead to deterioration of the strength as a molded article. When the density D is greater than 600 kg/m$^3$, a cell film becomes thick, and moldability may be reduced, or fusibility between expanded particles at molding may be reduced. The density D is more preferably 24 to 240 kg/m$^3$, further preferably 30 to 120 kg/m$^3$.

It is preferable that the expanded molded article has an average cell wall thickness in a range of 1 to 15 μm. When the average cell wall thickness is less than 1 μm, moldability at molding, particularly fusion may be deteriorated. When the average cell wall thickness is greater than 15 μm, increase in an expansion ratio may become difficult. The average cell wall thickness is more preferably 1 to 10 μm, further preferably 1 to 5 μm.

2-5. Open Cell Rate

It is preferable that an open cell rate is 0 to 50%. When the open cell rate is greater than 50%, a mechanical strength may be reduced. The open cell rate is more preferably 0 to 40%, further preferably 0 to 30%, particularly preferably 0 to 25%.

2-6. Expansion Ratio

It is preferable that an expansion ratio is in a range of 3 to 30 times. When the ratio is less than 3 times, a cell film of expanded particles becomes thick, and fusibility between expanded particles may be reduced at molding. When the ratio is greater than 30 times, a cell film becomes thin, the cell film breaks at expansion, a ratio of an open cell increases, and this may lead to deterioration of the strength as a molded article. The ratio is more preferably 4 to 20 times, further preferably 4 to 15 times.

2-7. Variability Rate X

When a value of a maximum point stress of a bending test at four points is measured at each temperature of −40° C., 23° C., 80° C., and 140° C., and an average of the value of a maximum point stress of a bending test at four points is calculated, the expanded molded article shows a variability rate X of the value of a maximum point stress of a bending test at four points to the average within a range of 0 to 50%.

In addition, when values of a maximum point stress of a bending test at four points are expressed as A, B, C, and D, the variability rate X is calculated by the following procedure. First, regarding A, an individual variability rate $X_A$ is calculated by the following expression:

|average of maximum point stress of bending test−A|/average of maximum point stress of bending test×100.

Similarly, also regarding B, C, and D, individual variability rates $X_B$, $X_C$ and $X_D$ are calculated. A greatest value among the resulting four individual variability rates is defined as a variability rate X.

The present inventors have found out that by showing this variability rate X by the expanded molded article, the expanded molded article can be provided in which a variation of a mechanical strength thereof is suppressed even when an environmental temperature changes. When the variability rate X is out of a range of 0 to 50%, it is difficult to obtain the expanded molded article in which a change of a mechanical strength thereof due to a change in an environmental temperature is suppressed. The variability rate X is preferably within a range of 0 to 45%, more preferably within a range of 0 to 40%.

For example, it is preferable that a maximum point stress of a bending test at 140° C. is 0.5 MPa to 20.0 MPa. When the maximum point stress of a bending test is less than 0.5 MPa, the strength is deficient, and the expanded molded article may become unable to stand impact or the like. When the maximum point stress of a bending test is greater than 20.0 MPa, the expanded molded article may be easily broken at the time of impact. The maximum point stress of a bending test is more preferably 0.5 to 10.0 MPa, further preferably 0.6 to 5.0 MPa.

2-8. Variability Rate Y

It is preferable that, when "maximum point stress of bending test/density" at four points is calculated by dividing the values of four points of a maximum point stress of a bending test at each temperature of −40° C., 23° C., 80° C., and 140° C. by the density of the expanded molded article, respectively, and an average of the "maximum point stress of bending test/density" at four points is calculated, the expanded molded article shows a variability rate Y of the value of "maximum point stress of bending test/density" at four points to the average within a range of 0 to 50%. By having this variability rate, the expanded molded article that is more resistant to change in an environmental temperature can be provided. The variability rate Y is preferably within a range of 0 to 45%, more preferably within a range of 0 to 40%.

In addition, an average of "maximum point stress of bending test/density" at four points can be calculated by the following expression:

$$(A/a+B/b+C/c+D/d)/4$$

when a set of a maximum point stress of a bending test and the density of four points are expressed as A and a, B and b, C and c, and D and d.

A variability rate Y is calculated by the following procedure, when a set of a maximum point stress of a bending test and the density of four points are expressed as A and a, B and b, C and c, and D and d. First, regarding A and a, an individual variability rate $Y_{Aa}$ is calculated by the following expression:

|average of "maximum point stress of bending test/density"−A/a|/average of "maximum point stress of bending test/density"×100.

Similarly, also regarding B and b, C and c, and D and d, individual variability rates $Y_{Bb}$, $Y_{Cc}$, and $Y_{Dd}$ are calculated. A greatest value among the resulting four individual variability rates is defined as a variability rate Y.

The density is preferably 30 to 400 kg/m$^3$, more preferably 50 to 300 kg/m$^3$.

2-9. Change Degree Z

It is preferable for the expanded molded article that "maximum point stress of bending test" at −40° C. shows a change degree Z that changes within a range of 0 to 0.88, to "maximum point stress of bending test" at 23° C. By having this change degree, the expanded molded article that is more resistant to change in an environmental temperature can be provided. The change degree Z is preferably 0 to 0.7, more preferably 0 to 0.5.

In addition, the change degree Z can be calculated by the following expression:

change degree Z=[(maximum point stress of bending test at −40° C.)−(maximum point stress of bending test at 23° C.)]÷(maximum point stress of bending test at 23° C.).

In addition, it is preferable for the expanded molded article that "maximum point stress of bending test" at 80° C. shows the change degree Z' that changes within a range of 0 to 0.6, to "maximum point stress of bending test" at 23° C. By having this change degree, the expanded molded article that is more resistant to change in an environmental temperature can be provided. The change degree Z' is preferably 0 to 0.5, more preferably 0 to 0.35.

In addition, the change degree Z' can be calculated by the following expression:

change degree Z'=[(maximum point stress of bending test at 23° C.)−(maximum point stress of bending test at 80° C.)]/(maximum point stress of bending test at 23° C.).

2-10. Polycarbonate-Based Resin

As a polycarbonate-based resin, the same polycarbonate-based resin as that for the above-mentioned expanded particles can be used.

2-11. Use of Expanded Molded Article

The expanded molded article can take various shapes depending on use, without particular limitation. For example, the expanded molded article can take various shapes depending on uses such as a building material (civil engineering related, housing related, and the like), a part of transportation equipment such as an automobile, an aircraft, a railway vehicle, and a ship, a structural member such as a windmill and a helmet, a packaging material, and a core material of FRP as a composite member.

From a view point that a variation of a mechanical strength is suppressed even when an environmental temperature changes, examples of the part of an automobile include, for example, parts used in the proximity of engines, exterior materials, and the like. Examples of the part of an automobile include, for example, parts such as a floor panel, a roof, a bonnet, a fender, an undercover, a wheel, a steering wheel, a container (housing), a hood panel, a suspension arm, a bumper, a sun visor, a trunk lid, a luggage box, a seat, a door, and a cowl.

2-12. Method of Producing Expanded Molded Article

The expanded molded article can be obtained, for example, by imparting a cell enlarging power to the above-mentioned expanded particles, and then, subjecting these expanded particles to a molding step.

It is preferable that before producing of the expanded molded article, a blowing agent is impregnated into the expanded particles to impart an expanding power thereto (secondary expanding power).

Examples of an impregnation method include a wet-type impregnation method of dispersing the expanded particles in a water system, and pressing a blowing agent therein while stirring, to thereby impregnate the blowing agent, a dry-type impregnation method substantially not using water (gaseous phase impregnation method), of placing the expanded particles into a sealable container, and pressing a blowing agent therein to impregnate the blowing agent, and the like. In particular, a dry-type impregnation method by which impregnation can be performed without using water is preferable. An impregnation pressure, an impregnation time, and an impregnation temperature when the blowing agent is impregnated into the expanded particles are not particularly limited.

As the blowing agent to be used, a blowing agent at production of the expanded particles, for example, the known volatile blowing agent or inorganic blowing agent can be used. Examples of the volatile blowing agent include an aliphatic hydrocarbon such as propane, butane, and pentane, an aromatic hydrocarbon, an alicyclic hydrocarbon, an aliphatic alcohol, and the like. Examples of the inorganic blowing agent include a carbonic acid gas, a nitrogen gas, the air, an inert gas (helium, argon, and the like), and the like. Among them, the inorganic blowing agent is preferably used. In particular, it is preferable to use one of a nitrogen gas, the air, an inert gas (helium, argon), and a carbonic acid gas, or use two or more of them together.

It is desirable that a pressure for imparting an internal pressure is a pressure to an extent that the expanded particles do not collapse, and is in such a range that an expanding power can be imparted. Such a pressure is preferably 0.1 to 4 MPa (gauge pressure), more preferably 0.3 to 3 MPa (gauge pressure). Impregnation of the blowing agent into the expanded particles in this manner is defined as internal pressure impartation.

It is preferable that an impregnation time is 0.5 to 200 hours. When the impregnation time is shorter than 0.5 hours, an impregnation amount of the blowing agent into the expanded particles is too small, and it may be difficult to obtain a necessary secondary expanding power at molding. When the impregnation time is longer than 200 hours, the productivity may be reduced. A more preferable impregnation time is 1 to 100 hours.

It is preferable that an impregnation temperature is 0 to 60° C. When the impregnation temperature is lower than 0° C., it may be difficult to obtain a sufficient secondary expanding power in a desired time. When the impregnation temperature is higher than 60° C., it may be difficult to obtain a sufficient secondary expanding power in a desired time. A more preferable impregnation temperature is 5 to 50° C.

The expanded particles with an internal pressure imparted thereto are taken out from the container at impregnation, and supplied to a molding space formed in a molding die of an expansion molding machine, thereafter, a heat medium is introduced therein, and thereby, the expanded particles can be in-die molded into a desired expanded molded article. As the expansion molding machine, an EPS molding machine that is used when the expanded molded article is produced from the expanded particles made of a polystyrene-based resin, and a molding machine with high-pressure specification, which is used when the expanded molded article is produced from the expanded particles made of a polypropylene-based resin and the like can be used. Regarding the heat medium, when a heating time becomes long, since shrinkage or deterioration in fusion may be generated in the expanded particles, the heat medium that can give the high energy in a short time is desired, and therefore, as such a heat medium, water steam is suitable.

It is preferable that a pressure of water steam is 0.2 to 1.0 MPa (gauge pressure). In addition, a heating time is preferably 10 to 90 seconds, more preferably 20 to 80 seconds.

In addition, for adjusting a cell density X and an average cell wall thickness, by adjusting impregnation conditions (impregnation temperature, impregnation time, impregnation pressure), and primary expansion conditions (expansion pressure, expansion time) of steps of producing the expanded molded article, in addition to using the expanded particles having the above-mentioned specified cell density X and specified average cell wall thickness, a cell density X and an average cell wall thickness can be large or small.

Additionally, for adjusting a bulk ratio and an average cell diameter, by adjusting impregnation conditions (impregnation temperature, impregnation time, impregnation pressure), and primary expansion conditions (expansion pressure, expansion time) of steps of producing the expanded molded article, in addition to using the expanded particles having the above-mentioned specified bulk ratio and specified average cell diameter, a bulk ratio and an average cell diameter can be large or small.

In addition, for adjusting a maximum point stress and the density of a bending test, by adjusting impregnation conditions (impregnation temperature, impregnation time, impregnation pressure), and molding conditions (expansion pressure, expansion time) of steps of producing the expanded molded article, a maximum point stress and the density of a bending test can be large or small.

2-13. Reinforced Composite

The expanded molded article may be used as a reinforced composite by laminating and integrating a skin material on the surface of the expanded molded article. When the expanded molded article is an expanded sheet, it is not necessary that the skin material is laminated and integrated on both sides of the expanded molded article, and it is sufficient if the skin surface is laminated and integrated on at least one side of both sides of the expanded molded article. Lamination of the skin material may be decided depending on uses of the reinforced composite. Among others, in view of a surface hardness and a mechanical strength of the reinforced composite, it is preferable that the skin material is laminated and integrated on each of both sides in a thickness direction of the expanded molded article.

The skin material is not particularly limited, but examples thereof include a fiber-reinforced plastic, a metal sheet, a synthetic resin film, and the like. Among them, a fiber-reinforced plastic is preferable. The reinforced composite using a fiber-reinforced plastic as the skin material is called fiber-reinforced composite.

Examples of a reinforcing fiber constituting the fiber-reinforced plastic include: inorganic fibers such as a glass fiber, a carbon fiber, a silicon carbide fiber, an alumina fiber, a tyranno fiber, a basalt fiber, and a ceramic fiber; metal fibers such as a stainless fiber and a steel fiber; organic fibers such as an aramid fiber, a polyethylene fiber, and a polyparaphenylenebenzoxazole (PBO) fiber; and a boron fiber. As the reinforcing fiber, one kind may be used alone, or two or more kinds may be used together. Among them, a carbon fiber, a glass fiber, and an aramid fiber are preferable, and a carbon fiber is more preferable. These reinforcing fibers have the excellent mechanical properties, in spite of being light.

It is preferable that the reinforcing fiber is used as a reinforcing fiber base material that has been processed into a desired shape. Examples of the reinforcing fiber base material include a woven fabric, a knitted fabric, and a non-woven fabric using a reinforcing fiber, a plane material in which a fiber bundle (strand) obtained by arranging reinforcing fibers in one direction is bound (sutured) with a yarn, and the like. Examples of a method of weaving a woven fabric include plain weaving, twill weaving, sateen weaving, and the like. In addition, examples of the yarn include a synthetic resin yarn such as a polyamide resin yarn and a polyester resin yarn, and a stitch yarn such as a glass fiber yarn.

As the reinforcing fiber base material, only one reinforcing fiber base material may be used without lamination, or a plurality of reinforcing fiber base materials may be used as a laminated reinforcing fiber base material by laminating them. As the laminated reinforcing fiber base material obtained by laminating a plurality of reinforcing fiber base materials, (1) a laminated reinforcing fiber base material obtained by preparing a plurality of reinforcing fiber base materials of only one kind, and laminating these reinforcing fiber base materials, (2) a laminated reinforcing fiber base material obtained by preparing a plurality of kinds of reinforcing fiber base materials, and laminating these reinforcing fiber base materials, (3) a laminated reinforcing fiber base material obtained by preparing a plurality of reinforcing fiber base materials in which a fiber bundle (strand) obtained by arranging reinforcing fibers in one direction is bound (sutured) with a yarn, stacking these reinforcing fiber base materials so that fiber directions of a fiber bundle are directed to mutually different directions, and integrating (suturing) stacked reinforcing fiber base materials with a yarn, and the like are used.

The fiber-reinforced plastic is one in which a synthetic resin is impregnated into a reinforcing fiber. Reinforcing fibers are bound and integrated with an impregnated synthetic resin.

A method of impregnating the synthetic resin into the reinforcing fiber is not particularly limited, but examples thereof include, for example, (1) a method of immersing the reinforcing fiber in the synthetic resin, (2) a method of coating the synthetic resin on the reinforcing fiber, and the like.

As the synthetic resin to be impregnated into the reinforcing fiber, any of a thermoplastic resin or a thermosetting resin can be used, and a thermosetting resin is preferably used. The thermosetting resin to be impregnated into the reinforcing fiber is not particularly limited, but examples thereof include an epoxy resin, an unsaturated polyester resin, a phenol resin, a melamine resin, a polyurethane resin, a silicone resin, a maleimide resin, a vinyl ester resin, a cyanic acid ester resin, a resin obtained by pre-polymerizing a maleimide resin and a cyanic acid ester resin, and the like, and since heat resistance, shock absorbability or chemical resistance is excellent, an epoxy resin and a vinyl ester resin are preferable. An additive such as a curing agent and a curing accelerator may be contained in the thermosetting resin. In addition, the thermosetting resin may be used alone, or two or more kinds may be used together.

In addition, the thermoplastic resin to be impregnated into the reinforcing fiber is not particularly limited, but examples thereof include an olefin-based resin, a polyester-based resin, a thermoplastic epoxy resin, an amide-based resin, a thermoplastic polyurethane resin, a sulfide-based resin, an acrylic-based resin, and the like, and since adhesive property with the expanded molded article or adhesive property between reinforcing fibers constituting the fiber-reinforced plastic is excellent, a polyester-based resin and a thermoplastic epoxy resin are preferable. In addition, the thermoplastic resin may be used alone, or two or more kinds thereof may be used together.

Examples of the thermoplastic epoxy resin include a polymer that is a polymer or a copolymer of epoxy compounds, and has a straight-chain structure, and a copolymer that is a copolymer of an epoxy compound and a monomer polymerizable with this epoxy compound, and has a straight-chain structure. Specifically, examples of the thermoplastic epoxy resin include, for example, a bisphenol A-type epoxy resin, a bisphenol fluorene-type epoxy resin, a cresol novolak-type epoxy resin, a phenol novolak-type epoxy resin, a cyclic aliphatic-type epoxy resin, a long chain aliphatic-type epoxy resin, a glycidyl ester-type epoxy resin, a glycidyl amine-type epoxy resin, and the like, and a bisphenol A-type epoxy resin and a bisphenol fluorene-type epoxy resin are preferable. In addition, the thermoplastic epoxy resin may be used alone, or two or more kinds may be used together.

Examples of the thermoplastic polyurethane resin include a polymer having a straight-chain structure, which is obtained by polymerizing a diol and a diisocyanate. Examples of the diol include, for example, ethylene glycol, diethylene glycol, propylene glycol, dipropylene glycol, 1,3-butanediol, 1,4-butanediol, and the like. The diol may be used alone, or two or more kinds may be used together. Example of the diisocyanate, include, for example, an aromatic diisocyanate, an aliphatic diisocyanate, and an alicyclic diisocyanate. The isocyanate may be used alone, or two or more kinds may be used together. In addition, the thermoplastic polyurethane resin may be used alone, or two or more kinds may be used together.

The content of the synthetic resin in the fiber-reinforced plastic is preferably 20 to 70% by weight. When the content is less than 20% by weight, binding ability between reinforcing fibers, or adhesive property between the fiber-reinforced plastic and the expanded molded article becomes insufficient, and the mechanical properties of the fiber-reinforced plastic or a mechanical strength of the fiber-reinforced composite may not be sufficiently improved. When the content is more than 70% by weight, the mechanical properties of the fiber-reinforced plastic are reduced, and a mechanical strength of the fiber-reinforced composite may not be sufficiently improved. The content is more preferably 30 to 60% by weight.

A thickness of the fiber-reinforced plastic is preferably 0.02 to 2 mm, more preferably 0.05 to 1 mm. The fiber-reinforced plastic having a thickness within this range is excellent in the mechanical properties in spite of being light.

A basis weight of the fiber-reinforced plastic is preferably 50 to 4000 g/m², more preferably 100 to 1000 g/m². The fiber-reinforced plastic having a basis weight in this range is excellent in the mechanical properties in spite of being light.

Then, a method of producing the reinforced composite will be described. A method of laminating and integrating a skin material on the surface of the expanded molded article to produce the reinforced composite is not particularly limited, but examples thereof include, for example, (1) a method of laminating and integrating the skin material on the surface of the expanded molded article via an adhesive agent, (2) a method of laminating, on the surface of the expanded molded article, a fiber-reinforced plastic forming material in which a thermoplastic resin is impregnated into a reinforcing fiber, and laminating and integrating the fiber-reinforced plastic forming material as a fiber-reinforced plastic, on the surface of the expanded molded article, using a thermoplastic resin impregnated into a reinforcing fiber as a binder, (3) a method of laminating, on the surface of the expanded molded article, a fiber-reinforced plastic forming material in which an uncured thermosetting resin is impregnated into a reinforcing fiber, and laminating and integrating, on the surface of the expanded molded article, a fiber-reinforced plastic formed by curing a thermosetting resin, using a thermosetting resin impregnated into a reinforcing fiber as a binder, (4) a method of disposing, on the surface of the expanded molded article, a skin material that has become softened by heating, and laminating and integrating the skin material on the surface of the expanded molded article, if necessary, while deforming the skin material along the surface of the expanded molded article, by pressing the skin material on the surface of the expanded molded article, (5) a method that is generally applied in molding of the fiber-reinforced plastic, and the like. From a view point that the expanded molded article is excellent in the mechanical properties such as load resistance under the high temperature environment, the above-mentioned method (4) can also be suitably used.

Examples of a method that is used in molding of the fiber-reinforced plastic include, for example, an autoclave method, a hand lay-up method, a spray up method, a PCM (Prepreg Compression Molding) method, a RTM (Resin Transfer Molding) method, a VaRTM (Vacuum assisted Resin Transfer Molding) method, and the like.

The thus obtained fiber-reinforced composite is excellent in heat resistance, a mechanical strength, and lightness. For that reason, the composite can be used in a wide range of uses such as the transportation equipment field such as an automobile, an aircraft, a railway vehicle, and a ship, the home electric appliance field, the information terminal field, and the field of household furniture.

For example, the fiber-reinforced composite can be suitably used as a part of transportation equipment, and a part for constituting transportation equipment including a structural part constituting a body of transportation equipment (particularly, a part of an automobile), a windmill blade, a robot arm, a buffering material for a helmet, an agricultural box, a transportation container such as a heat/cold insulating container, a rotor blade of an industrial helicopter, and a part packaging material.

According to the present invention, there is provided a part of an automobile constituted of the fiber-reinforced composite of the present invention, and examples of the part of an automobile include, for example, parts such as a floor panel, a roof, a bonnet, a fender, an undercover, a wheel, a steering wheel, a container (housing), a hood panel, a suspension arm, a bumper, a sun visor, a trunk lid, a luggage box, a seat, a door, and a cowl.

EXAMPLES

The present invention will be specifically described below by way of Examples, but the present invention is not limited thereto. First, methods of measuring various physical properties in Examples will be described below.
[Density of Polycarbonate-Based Resin]
The density of the polycarbonate-based resin was measured by a method defined in ISO1183-1:2004, or ASTM D-792.
[Impregnation Amount of Blowing Agent]
An impregnation amount of blowing agent is defined as a value calculated by the following expression.

an impregnation amount of blowing agent (% by weight)=(weight immediately after impregnation and takeout−weight before impregnation)/weight before impregnation×100

[Average Particle Diameter]
An average particle diameter is defined as a value expressed by D50.

Specifically, using a Ro-Tap type sieve shaker (manufactured by SIEVE FACTORY IIDA Co., Ltd.), about 25 g of a sample was classified with JIS standard sieves (JIS Z8801-1:2006) having a sieve aperture of 26.5 mm, 22.4 mm, 19.0 mm, 16.0 mm, 13.2 mm, 11.20 mm, 9.50 mm, 8.80 mm, 6.70 mm, 5.66 mm, 4.76 mm, 4.00 mm, 3.35 mm, 2.80 mm, 2.36 mm, 2.00 mm, 1.70 mm, 1.40 mm, 1.18 mm, 1.00 mm, 0.85 mm, 0.71 mm, 0.60 mm, 0.50 mm, 0.425 mm, 0.355 mm, 0.300 mm, 0.250 mm, 0.212 mm, and 0.180 mm for 10 minutes, and the weight of the sample on a sieve mesh was measured. From the obtained results, an accumulated weight distribution curve was prepared, and a particle diameter at which the accumulated weight becomes 50% (median diameter) was defined as an average particle diameter.

[Average Cell Diameter of Expanded Particles]

A central part of a cross section obtained by dividing, at a central part, expanded particles extracted from expanded particles obtained by primary expansion roughly into two parts was magnified 200 to 1200 times and photographed using a scanning electron microscope. A photographed image was printed on an A4 paper. On an expanded particle cross-sectional image, three parallel arbitrary straight lines (length 60 mm) were drawn in a longitudinal direction and a transverse direction, and when there was a cell having an extremely large cell diameter, each three of arbitrary straight lines were drawn in each direction away from the cell.

In addition, an arbitrary straight line was drawn so that a cell comes in contact only at a tangent point as little as possible, and when it comes in contact, this cell was also added to the number. The cell numbers counted regarding three arbitrary straight lines in each direction of a longitudinal direction and a transverse direction were arithmetically averaged, and this was defined as the cell number.

An average chord length t of a cell was calculated from an image magnification at which the cell number was counted, and this cell number, by the following expression.

$$\text{average chord length } t \text{ (mm)} = 60/(\text{cell number} \times \text{image magnification})$$

The image magnification was obtained by the following expression by measuring a scale bar on an image with "Digimatic Caliper" manufactured by Mitsutoyo Corporation to $1/100$ mm.

$$\text{image magnification} = \text{measured value of scale bar (mm)}/\text{indicated value of scale bar (mm)}$$

Then, a cell diameter was calculated by the following expression.

$$\text{average cell diameter } C(\mu m) = (t/0.616) \times 1000$$

[Average Cell Diameter of Expanded Molded Article]

Length 50 mm×width 50 mm×thickness 30 mm was excised from a central part of a molded article of length 400 mm×width 300 mm×thickness 30 mm, a cross section in a thickness direction of the excised molded article piece was magnified 200 to 1200 times and photographed using a scanning electron microscope. A photographed image was printed on an A4 paper. On an expanded molded article cross-sectional image, three parallel arbitrary straight lines (length 60 mm) were drawn in a longitudinal direction and a transverse direction, and when there was a cell having an extremely large cell diameter, each three of arbitrary straight lines were drawn in each direction away from the cell.

In addition, arbitrary straight lines were drawn so that a cell comes in contact only at a tangent point as little as possible, and when it comes in contact, this cell was also added to the number. The cell numbers counted regarding three arbitrary straight lines in each direction of a longitudinal direction and a transverse direction were arithmetically averaged, and this was defined as the cell number.

An average chord length t of a cell was calculated from an image magnification at which the cell number was counted, and this cell number, by the following expression.

$$\text{average chord length } t \text{ (mm)} = 60/(\text{cell number} \times \text{image magnification})$$

The image magnification was obtained by the following expression by measuring a scale bar on an image with "Digimatic Caliper" manufactured by Mitsutoyo Corporation to $1/100$ mm.

$$\text{image magnification} = \text{measured value of scale bar (mm)}/\text{indicated value of scale bar (mm)}$$

Then, an average cell diameter was calculated by the following expression.

$$\text{average cell diameter } C(\mu m) = (t/0.616) \times 1000$$

[Bulk Density and Bulk Ratio of Expanded Particles]

About 1000 cm³ of expanded particles were filled into a measuring cylinder up to a graduation of 1000 cm³. In addition, the measuring cylinder was visually seen from a horizontal direction, and if any one of expanded particles had reached a graduation of 1000 cm³, filling of expanded particles into the measuring cylinder was completed at that time point. Then, the weight of expanded particles filled into the measuring cylinder was weighed with significant figures to a second decimal place, and the weight was defined as W (g). Then, the bulk density of the expanded particles was obtained by the following expression.

$$\text{bulk density} (kg/m^3) = (W/1000)[1000 \times (0.01)^3]$$

A bulk ratio was defined as a value obtained by multiplying an inverse number of a bulk density by the density $(kg/m^3)$ of a polycarbonate-based resin.

[Apparent Density and Apparent Ratio of Expanded Particles]

The weight A (g) of about 25 cm³ of expanded particles was measured. Subsequently, an empty wire net container, from which placed expanded particles are not slopped in the state where the container is closed with a lid, was immersed in water, and the weight B (g) of the empty wire net container in the state of being immersed in water was measured. Then, the expanded particles at the whole quantity were placed into this wire net container, thereafter, this wire net container was immersed in water, the container was swung a few times to remove cells attached to the container and the expanded particles, thereafter, the weight C (g) that is the sum of the weight of the wire net container in the state of being immersed in water, and the whole quantity of the expanded particles placed in this wire net container was measured. Then, an apparent density D $(kg/m^3)$ of the expanded particles was calculated by the following expression.

$$D = A/(A+(B-C)) \times 1000$$

An apparent ratio was defined as a value obtained by multiplying an inverse number of an apparent density by the density $(kg/m^3)$ of a polycarbonate-based resin.

[Density and Expansion Ratio of Expanded Molded Article]

The density $(kg/m^3)$ of the expanded molded article was obtained by the expression (a)/(b), by measuring the weight (a) and the volume (b) of a test piece (width 75 mm×length 300 mm×thickness 30 mm) excised from the expanded molded article (that had been dried at 40° C. for 20 hours or longer after molding), each to 3 or more significant figures (condition A), or the density was obtained by the expression (a)/(b), by measuring the weight (a) and the volume (b) of a test piece (width 25 mm×length 130 mm×thickness 20 mm) excised from the expanded molded article (that had been dried at 50° C. for 5 hours or longer after molding), each to 3 or more significant figures (condition B). Measurement was performed under a temperature of 23° C.

As an expansion ratio was defined as a value obtained by multiplying an inverse number of the density by the density $(kg/m^3)$ of a polycarbonate-based resin.

[Open Cell Rate of Expanded Particles]

A sample cup of "Air Comparison Pycnometer 1000 type" manufactured by Tokyo Science Co., Ltd. was prepared, and a total weight A (g) of expanded particles at such an amount that fills around 80% of this sample cup was measured. The volume B (cm$^3$) of the whole of the expanded particles was measured by a 1-1/2-1 air pressure method using an air comparison pycnometer, and the pycnometer was corrected with standard spheres (large 28.96 cm$^3$, small 8.58 cm$^3$). Subsequently, an empty wire net container, from which placed expanded particles are not slopped in the state where the container is closed with a lid, was immersed in water, and the weight C (g) of the empty wire net container in the state of being immersed in water was measured. Then, the expanded particles at the whole quantity were placed into this wire net container, thereafter, this wire net container was immersed in water, the container was swung a few times to remove cells attached to the container and the expanded particles, thereafter, the weight D (g) that is the sum of the weight of the wire net container in the state of being immersed in water, and the whole quantity of the expanded particles placed in this wire net container was measured. Then, an apparent volume E (cm$^3$) of the expanded particles was calculated by the following expression. An open cell rate of the expanded particles was calculated by the following expression, based on this apparent volume E (cm$^3$) and the volume B (cm$^3$) of the whole of the expanded particles.

$$E=A+(C-D)$$

$$\text{open cell rate (\%)}=100\times(E-B)/E$$

[Open Cell Rate of Expanded Molded Article]

An expanded article was excised so that all six surfaces of a molded article do not have a molded surface skin, and further, the cut section surface was finished with "FK-4N" Bread Slicer manufactured by Fujishima Koki Co., Ltd., to prepare five cubic test pieces of width 25 mm×length 25 mm×thickness 25 mm. An external dimension of the resulting test piece was measured to 1/100 mm using "Digimatic Caliper" manufactured by Mitsutoyo Corporation, and an apparent volume (cm$^3$) was obtained. Then, using "1000 type" Air Comparison Pycnometer manufactured by Tokyo Science Co., Ltd., the volume (cm$^3$) of the test piece was obtained by a 1-1/2-1 air pressure method. An open cell rate (%) was calculated by the following expression, and an average of an open cell rate of five test pieces was obtained. Test pieces had been stored for 16 hours in advance under the environment of Symbol 23/50, 2-Class of JIS K7100: 1999, thereafter, measurement was performed under the same environment. In addition, the air comparison pycnometer was corrected with standard spheres (large 28.96 cm$^3$, small 8.58 cm$^3$).

$$\text{open cell rate (\%)}=(\text{apparent volume}-\text{volume measured with air comparison pycnometer})/\text{apparent volume}\times 100$$

[Average Cell Wall Thickness of Expanded Particles]

An average cell wall thickness of the expanded particles was calculated as follows. The thickness was calculated by the following expression, using an average cell diameter and an apparent ratio of the expanded particles, obtained by the above-mentioned measuring method.

$$\text{average cell wall thickness}(\mu m)=\text{average cell diameter } C(\mu m)\times(1/(1-(1/\text{apparent ratio}))^{(1/3)}-1)$$

[Average Cell Wall Thickness of Expanded Molded Article]

An average cell wall thickness of the expanded molded article was calculated as follows. The thickness was calculated by the following expression, using an average cell diameter and a ratio of the expanded molded article, obtained by the above-mentioned measuring method.

$$\text{average cell wall thickness}(\mu m)=\text{average cell diameter } C(\mu m)\times(1/(1-(1/\text{ratio}))^{(1/3)}-1)$$

[Bending Test: Density as Well as Load, Stress, Displacement, and Energy of Maximum Point]

The load, the stress, the displacement, and the energy of a maximum point were measured by a method conforming to JIS K7221-1:2006 "Rigid cellular plastics—Determination of flexural properties—Part 1: Basic bending test". That is, from the expanded molded article, a rectangular parallelepiped test piece of width 25 mm×length 130 mm×thickness 20 mm was excised. For measurement, a Tensilon universal testing machine ("UCT-10T" manufactured by Orientec Co., Ltd.) was used. A bending maximum point stress of the bending strength was calculated using a universal testing machine data processing system ("UTPS-2375 Ver, 1.00" manufactured by SOFTBRAIN Co., Ltd.).

A strip-shaped test piece was placed on a support stand, and a bending maximum point stress was measured under the conditions of a load cell 1000 N, a test speed 10 mm/min, a tip jig of a support stand 5R, and an opening width 100 mm. The number of test pieces was 5 or more, the state was adjusted over 16 hours under the standard environment of Symbol "23/50" (temperature 23° C., relative humidity 50%), 2-Class of JIS K7100:1999, and thereafter, measurement was performed under the same standard environment. After the state was regulated over 24 hours in a thermostatic bath set at each test temperature of −40° C., 80° C., and 140° C., the test piece was set on a jig in a thermostatic bath attached to an apparatus, which had been rapidly set at each designated temperature, and measurement was performed after 3 minutes. An arithmetic mean of a bending maximum point stress of each test piece was defined as a bending maximum point stress of the expanded molded article, respectively.

Additionally, a bending maximum point stress per unit density was calculated by dividing a bending maximum point stress by the density of the expanded molded article.

In addition, the density (kg/m$^3$) of the expanded molded article was obtained by the expression (a)/(b), by measuring the weight (a) and the volume (b) of a test piece excised from the expanded molded article.

[Bending Test: Elastic Modulus]

The bending elastic modulus was measured by a method conforming to JIS K7221-1:2006 "Rigid cellular plastics—Determination of flexural properties—Part 1: Basic bending test". That is, from the expanded molded article, a rectangular parallelepiped test piece of width 25 mm×length 130 mm×thickness 20 mm was excised. For measurement, a Tensilon universal testing machine ("UCT-10T" manufactured by Orientec Co., Ltd.) was used. The bending elastic modulus was calculated by the following expression, using a universal testing machine data processing system ("UTPS-2375 Ver, 1.00" manufactured by SOFTBRAIN Co., Ltd.). The number of test pieces was 5 or more, the state was adjusted over 16 hours under the standard environment of Symbol "23/50" (temperature 23° C., relative humidity 50%), 2-Class of JIS K7100:1999, and thereafter, measurement was performed under the same standard environment. An arithmetic mean of the compression elastic modulus of each test piece was defined as the bending elastic modulus of the expanded molded article, respectively.

The bending elastic modulus was calculated by the following expression using an initial straight portion of a load-deformation curve.

E=Δσ/Δε

E: Bending elastic modulus (MPa)

Δσ: Difference in stress between two points on straight line (MPa)

Δε: Difference in deformation between the same two points (%)

In addition, the bending elastic modulus per unit density was calculated by dividing the bending elastic modulus by the density of the expanded molded article.

[Compression Test: Density as Well as 5%, 10%, 25%, and 50% Stresses]

A 5% compression stress, a 10% compression stress, a 25% compression stress, and a 50% compression stress of the expanded molded article were measured by a method described in JIS K7220:2006 "Rigid cellular plastics—Determination of compression properties". That is, using a Tensilon universal testing machine ("UCT-10T" manufactured by Orientec Co., Ltd.) and a universal testing machine data processing system ("UTPS-2375 Ver, 1.00" manufactured by SOFTBRAIN Co., Ltd.), the compression strength (5% deformation compression stress, 25% deformation compression stress, compression elastic modulus) was measured under a test specimen size cross section 50 mm×50 mm and thickness 25 mm, and a compression speed of 2.5 mm/min. The number of test pieces was 5 or more, the state was adjusted over 16 hours under the standard environment of Symbol "23/50" (temperature 23° C., relative humidity 50%), 2-Class of JIS K7100:1999, and thereafter, measurement was performed under the same standard environment. An arithmetic mean of the compression strength (5% deformation compression stress, 10% deformation compression stress, 25% deformation compression stress, 50% deformation compression stress) of each test piece was defined as a 5% compression stress, a 10% compression stress, a 25% compression stress, and a 50% compression stress of the expanded molded article, respectively.

(5% (10%, 25%, 50%) Deformation Compression Stress)

A 5% (10%, 25%, 50%) deformation compression stress was calculated by the following expression. In addition, the inside of ( ) was defined as the condition for calculating a 10% deformation compression stress, a 25% deformation compression stress, or a 50% deformation compression stress.

σ5 (10, 25, 50)=F5 (10, 25, 50)/$A_0$

σ5 (10, 25, 50): 5% (10%, 25%, 50%) deformation compression stress (MPa)

F5 (10, 25, 50): force (N) at 5% (10%, 25%, 50%) deformation $A_0$: Initial cross-sectional area of test piece (mm$^2$)

[Compression Test: Elastic Modulus]

The compression elastic modulus of the expanded molded article was measured by a method described in JIS K7220: 2006 "Rigid cellular plastics—Determination of compression properties". That is, using a Tensilon universal testing machine ("UCT-10T" manufactured by Orientec Co., Ltd.), and a universal testing machine data processing system ("UTPS-2375 Ver, 1.00" manufactured by SOFTBRAIN Co., Ltd.), the compression elastic modulus was calculated by the following expression under a test specimen size cross section 50 mm×50 mm and thickness 25 mm, and a compression speed of 2.5 mm/min. The number of test pieces was 5 or more, the state was adjusted over 16 hours under the standard environment of Symbol "23/50" (temperature 23° C., relative humidity 50%), 2-Class of JIS K7100:1999, and thereafter, measurement was performed under the same standard environment. An arithmetic mean of the compression elastic modulus of each test piece was defined as the compression elastic modulus of the expanded molded article.

The compression elastic modulus was calculated by the following expression using an initial straight portion of a load-deformation curve.

E=Δσ/Δε

E: Compression elastic modulus (MPa)

Δσ: Difference in stress between two points on straight line (MPa)

Δε: Difference in deformation between the two same points (%)

In addition, the compression elastic modulus per unit density was calculated by dividing the compression elastic modulus by the density of the expanded molded article.

Example 1a (Resin Particles Production Step)

Polycarbonate-based resin particles (Panlite L-1250Y manufactured by Teijin Limited, density 1.2×10$^3$ kg/m$^3$) were dried at 120° C. for 4 hours. The resulting dried product was supplied to a single screw extruder having a bore diameter of 40 mm at a ratio of 10 kg/hr per hour to melt and knead the product at 290° C. Subsequently, the kneaded product was extruded into a chamber accommodating cooling water at about 10° C., from die holes (four nozzles having a diameter of 1.5 mm are arranged) of a die (temperature: 290° C., inlet side resin pressure: 13 MPa) mounted to a tip portion of a single screw extruder, a rotating shaft of a rotary blade having four cutting blades was rotated at a rotation number of 5000 rpm to cut the extruded product into particles, and thereby, the particles were cooled with the cooling water to prepare resin particles (average particle diameter 1.4 mm).

(Impregnation Step)

100 parts by weight of the above-mentioned resin particles were closed in a pressure vessel, the inside of the pressure vessel was substituted with a carbonic acid gas, and thereafter, a carbonic acid gas was pressed therein to an impregnation pressure of 1.5 MPa. The pressure vessel was left at rest under the environment at 20° C., and after a lapse of an impregnation time of 24 hours, the inside of the pressure vessel was slowly depressurized over 5 minutes. In this way, the resin particles were impregnated with a carbonic acid gas to obtain expandable particles. In addition, an impregnation amount of blowing agent at this time was 4.8% by weight.

(Expansion Step)

Immediately after depressurization in the above-mentioned impregnation step, the expandable particles were taken out from the pressure vessel, and thereafter, the above-mentioned impregnation product was expanded with water steam in an expansion tank at a high pressure, while stirring at an expansion temperature of 142° C. for 48 seconds using water steam. After expansion, drying was performed with an airstream drying machine to obtain expanded particles. When a bulk density of the resulting expanded particles was measured by the above-mentioned method, the bulk density was 109 kg/m$^3$ (expansion ratio 10.95 times).

(Molding Step)

After the resulting expanded particles were allowed to stand at room temperature (23° C.) for one day, and thereafter, was closed in a pressure vessel, the inside of the pressure vessel was substituted with a nitrogen gas, and thereafter, a nitrogen gas was pressed therein to an impregnation pressure (gauge pressure) of 1.6 MPa. The pressure vessel was left at rest under the environment at 20° C., and pressure aging was carried out for 24 hours. After taken out, the expanded particles were filled into a 30 mm×300 mm×400 mm molding die, heated with water steam at 0.85 MPa for 40 seconds, and then, cooled until a maximum surface pressure of an expanded molded article dropped to 0.05 MPa, and thereby, an expanded molded article having an expansion ratio of 11.64 times (density 103 kg/m$^3$) was obtained.

Example 2a

In the same manner as that of Example 1a except that a carbonic acid gas was pressed therein to an impregnation pressure of 1.3 MPa, an impregnation amount of a blowing agent was 4.5% by weight, and an expansion time was 60 seconds, expanded particles having a bulk ratio of 11.7 times (bulk density 103 kg/m$^3$) and an expanded molded article having an expansion ratio of 13.3 times (density 90 kg/m$^3$) were obtained.

Example 3a

In the same manner as that of Example 1a except that a carbonic acid gas was pressed therein to an impregnation pressure of 1.0 MPa, an impregnation amount of a blowing agent was 3.9% by weight, and an expansion time was 102 seconds, expanded particles having a bulk ratio of 11.89 times (bulk density 101 kg/m$^3$) and an expanded molded article having an expansion ratio of 7.75 times (density 155 kg/m$^3$) were obtained.

Example 4a

In the same manner as that of Example 1a except that a carbonic acid gas was pressed therein to an impregnation pressure of 1.0 MPa, an impregnation amount of a blowing agent was 4.0% by weight, and an expansion time was 59 seconds, expanded particles having a bulk ratio of 5.5 times (bulk density 218 kg/m$^3$) and an expanded molded article having an expansion ratio of 4.30 times (density 279 kg/m$^3$) were obtained.

Example 5a

In the same manner as that of Example 1a except that a carbonic acid gas was pressed therein to an impregnation pressure of 1.5 MPa, an impregnation amount of a blowing agent was 5.2% by weight, Panlite Z-2601 (density 1.2×10$^3$ kg/m$^3$) manufactured by Teijin Limited was used as a polycarbonate-based resin, an expansion temperature was 145° C., and an expansion time was 31 seconds, expanded particles having a bulk ratio of 10.4 times (bulk density 116 kg/m$^3$) and an expanded molded article having an expansion ratio of 10.25 times (density 117 kg/m$^3$) were obtained.

Example 6a

In the same manner as that of Example 1a except that a carbonic acid gas was pressed therein to an impregnation pressure of 1.3 MPa, an impregnation amount of a blowing agent was 4.5% by weight, Panlite Z-2601 manufactured by Teijin Limited was used as a polycarbonate-based resin, an expansion temperature was 145° C., and an expansion time was 32 seconds, expanded particles having a bulk ratio of 9.4 times (bulk density 128 kg/m$^3$), and an expanded molded article having an expansion ratio of 9.64 times (density 125 kg/m$^3$) were obtained.

Comparative Example 1a

In the same manner as that of Example 1a except that a carbonic acid gas was pressed therein to an impregnation pressure of 4.0 MPa, an impregnation amount of a blowing agent was 9.5% by weight, and an impregnation time was 32 seconds, expanded particles having a bulk ratio of 9.91 times (bulk density 121 kg/m$^3$) and an expanded molded article having an expansion ratio of 6.83 times (density 176 kg/m$^3$) were obtained.

Comparative Example 2a

In the same manner as that of Example 1a except that a carbonic acid gas was pressed therein to an impregnation pressure of 4.0 MPa, an impregnation amount of a blowing agent was 9.5% by weight, and an impregnation time was 32 seconds, expanded particles having a bulk ratio of 7.95 times (bulk density 151 kg/m$^3$) and an expanded molded article having an expansion ratio of 4.65 times (density 258 kg/m$^3$) were obtained.

Comparative Example 3a

In the same manner as that of Example 1a except that a carbonic acid gas was pressed therein to an impregnation pressure of 4.0 MPa, an impregnation amount of a blowing agent was 7.8% by weight, Panlite Z-2601 manufactured by Teijin Limited was used as a polycarbonate-based resin, an expansion temperature was 145° C., and an expansion time was 23 seconds, expanded particles having a bulk ratio of 6.4 times (bulk density 188 kg/m$^3$) and an expanded molded article having an expansion ratio of 4.62 times (density 260 kg/m$^3$) were obtained.

An average cell diameter C, a bulk ratio, a bulk density, an apparent ratio, an apparent density D, a cell number density, and an average cell wall thickness of primary expanded particles, as well as an average cell diameter C, an open cell rate, an expansion ratio, a density D, a cell density X, an average cell wall thickness, and bending test results, and compression test results assessment of expanded molded articles, of Examples 1a to 6a and Comparative Examples 1a to 3a, are shown in Tables 1 and 2.

Figure 2:
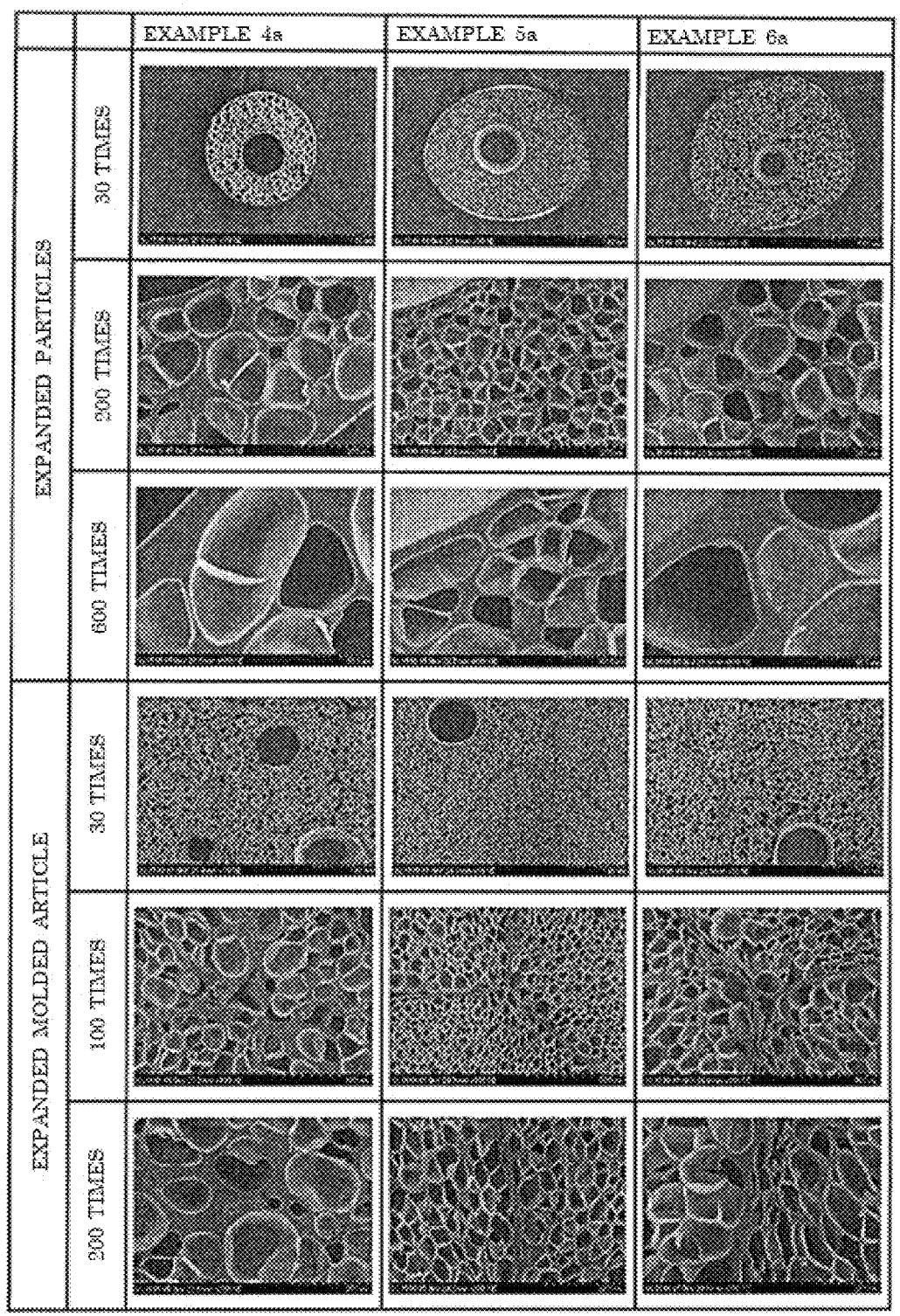
Figure 3:
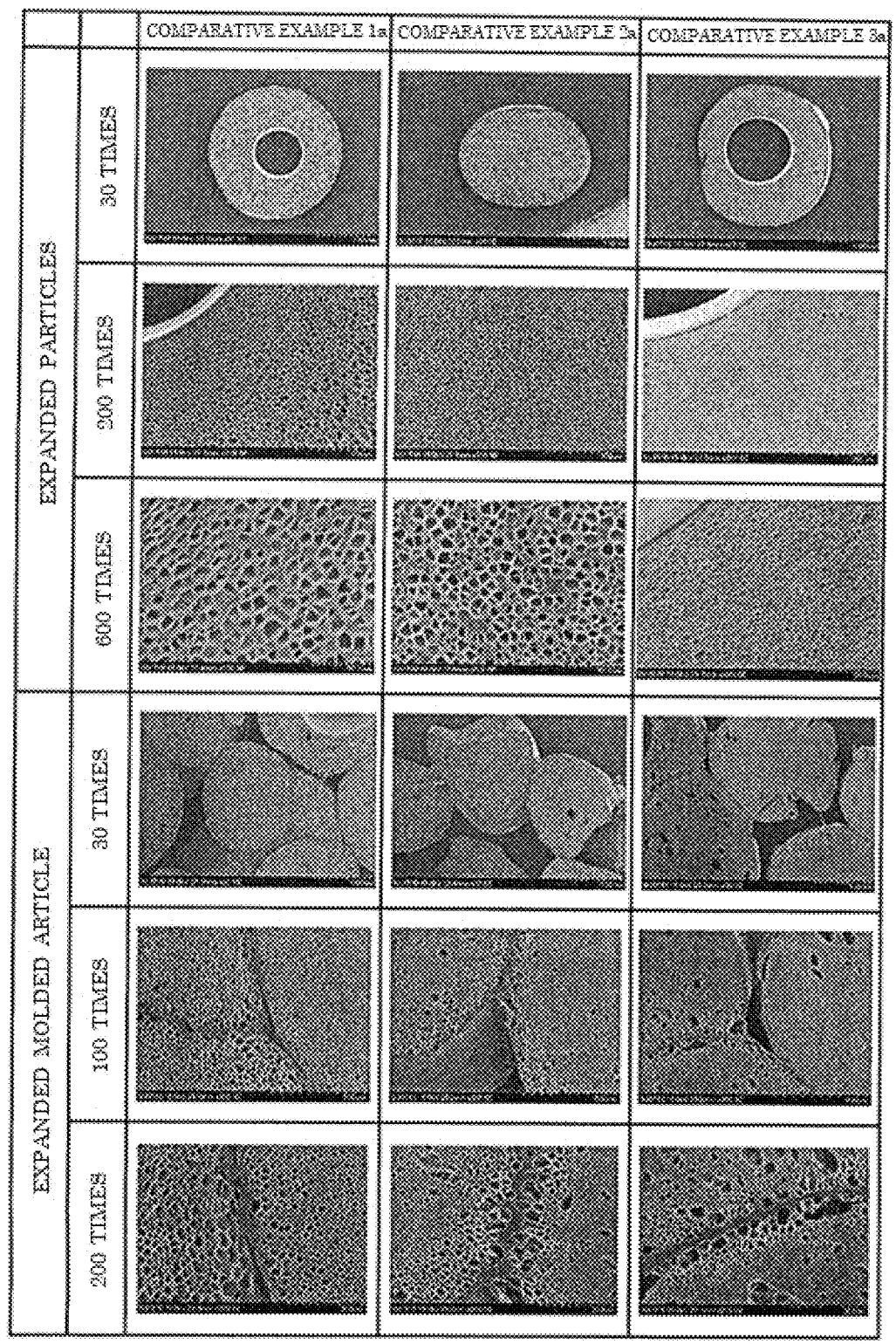

In addition, photographs obtained by magnifying cut sections of expanded particles and expanded molded articles of Examples 1a to 6a and Comparative Examples 1a to 3a 30 to 600 times with a scanning electron microscope are shown in FIGS. 1 to 3.

TABLE 1

|  |  | Unit | Example 1a | Example 2a | Example 3a | Example 4a | Example 5a | Example 6a | Comparative Example 1a | Comparative Example 2a | Comparative Example 3a |
|---|---|---|---|---|---|---|---|---|---|---|---|
| Resin kind |  | — | L1250Y | L1250Y | L1250Y | L1250Y | Z-2601 | Z-2601 | L1250Y | L1250Y | Z-2601 |
| Impregnation amount of blowing agent |  | % by weight | 4.8 | 4.5 | 3.9 | 4 | 5.2 | 4.5 | 9.5 | 9.5 | 7.8 |
| Expanded particles | Average cell diameter | μm | 61.5 | 81.4 | 85.4 | 120 | 62.3 | 120 | 18.0 | 13.7 | 5.2 |
|  | Open cell rate | % | 3.02 | 0 | 0 | 2.3 | 0.74 | 0.31 | 10.2 | 24.6 | 3.25 |
|  | Bulk ratio | Times | 10.95 | 11.7 | 11.89 | 5.5 | 10.4 | 9.4 | 9.91 | 7.95 | 6.4 |
|  | Bulk density | kg/m$^3$ | 109 | 103 | 101 | 218 | 116 | 128 | 121 | 151 | 188 |
|  | Apparent ratio | Times | 6.8 | 7.1 | 7.1 | 3.4 | 6.1 | 5.5 | 6.2 | 4.5 | 3.9 |
|  | Apparent density | kg/m$^3$ | 178 | 170 | 169 | 349 | 196 | 219 | 194 | 267 | 305 |
|  | Cell number density | Pieces/cm$^3$ | $4.7 \times 10^7$ | $2.1 \times 10^7$ | $1.9 \times 10^7$ | $2.7 \times 10^6$ | $4.0 \times 10^7$ | $5.0 \times 10^6$ | $1.7 \times 10^9$ | $2.6 \times 10^9$ | $4.0 \times 10^{10}$ |
|  | Average cell wall thickness | μm | 3.38 | 4.25 | 4.43 | 14.56 | 3.83 | 8.30 | 1.09 | 1.20 | 0.53 |

TABLE 2

|  |  |  | Unit | Example 1a | Example 2a | Example 3a | Example 4a | Example 5a | Example 6a | Comparative Example 1a | Comparative Example 2a | Comparative Example 3a |
|---|---|---|---|---|---|---|---|---|---|---|---|---|
| Expanded molded article | Average cell diameter |  | μm | 84 | 99.4 | 99.9 | 139.1 | 79.7 | 175.6 | 17 | 17.9 | 8.11 |
|  | Open cell rate |  | % | 35.43 | 39.42 | 92.86 | 54.03 | 8.96 | 16.35 | 70.68 | 67.8 | 54.95 |
|  | Expansion ratio (condition A) |  | Times | 11.64 | 13.3 | 7.75 | 4.30 | 10.25 | 9.64 | 6.83 | 4.65 | 4.62 |
|  | Density |  | kg/m$^3$ | 103 | 90 | 155 | 279 | 117 | 125 | 176 | 258 | 260 |
|  | Cell number density |  | Pieces/cm$^3$ | $3.4 \times 10^7$ | $2.4 \times 10^7$ | $1.3 \times 10^7$ | $2.3 \times 10^6$ | $3.5 \times 10^7$ | $3.0 \times 10^6$ | $2.3 \times 10^9$ | $1.2 \times 10^9$ | $1.3 \times 10^{10}$ |
|  | Average cell wall thickness |  | μm | 2.55 | 2.62 | 4.71 | 12.83 | 2.77 | 6.53 | 0.92 | 1.50 | 0.69 |
|  | Bending test | Maximum point load | N | 65.8 | 72.4 | 88.6 | 302 | 145.01 | 138.33 | 80.6 | 107.8 | 157.4 |
|  |  | Maximum point stress | MPa | 0.87 | 1.04 | 1.27 | 4.54 | 2.06 | 2.01 | 1.11 | 1.48 | 2.19 |
|  |  | Maximum point stress (per unit density) | MPa/(kg/m$^3$) | 8.4 | 11.56 | 8.20 | 16.27 | 17.60 | 16.14 | 6.31 | 5.73 | 8.43 |
|  |  | Maximum point displacement | mm | 2.67 | 11.88 | 9.32 | 9.79 | 6.98 | 6.97 | 6.64 | 6.25 | 3.9 |
|  |  | Elastic modulus | MPa | 29.2 | 19.5 | 25.2 | 79 | 43.9 | 40.3 | 22.6 | 36.4 | 62.2 |
|  |  | Elastic modulus (per unit density) | MPa/(kg/m$^3$) | 283 | 217 | 163 | 283 | 375 | 324 | 128 | 141 | 239 |
|  |  | Maximum point energy | J | 0.097 | 0.64 | 0.59 | 2.02 | 0.67 | 0.63 | 0.35 | 0.46 | 0.37 |
|  | Compression test | 5% stress | MPa | 0.011 | 0.52 | 0.62 | 2.3 | 1.02 | 1.06 | 0.62 | 0.85 | 1.30 |
|  |  | 10% stress | MPa | 0.55 | 0.58 | 0.69 | 2.7 | 1.12 | 1.18 | 0.82 | 1.23 | 1.88 |
|  |  | 25% stress | MPa | 0.90 | 0.68 | 0.85 | 3.36 | 1.35 | 1.45 | 1.18 | 2.17 | 3.26 |
|  |  | 50% stress | MPa | 1.23 | 0.88 | 1.31 | 4.94 | 1.73 | 1.89 | 1.80 | 4.32 | 5.92 |
|  |  | Elastic modulus | MPa | 21.7 | 17 | 17.1 | 56.5 | 37.3 | 38.4 | 16.4 | 21 | 38.6 |
|  |  | Elastic modulus (per unit density) | MPa/(kg/m$^3$) | 211 | 189 | 110 | 203 | 319 | 309 | 93 | 81 | 148 |

From the above-mentioned Tables 1 and 2, it is seen that by regulating a cell density X and an average cell wall thickness to specified ranges, an expanded molded article having a high mechanical strength is obtained. Specifically, when Examples 1a to 4a and Comparative Examples 1a to 2a using the same L1250Y as a polycarbonate-based resin are compared, it is seen that a maximum point stress and the elastic modulus per unit density in a bending test, and the elastic modulus per unit density in a compression test are further improved in Examples than in Comparative Examples. Furthermore, when Examples 5a to 6a and Comparative Example 3a using the same Z-2601 as a polycarbonate-based resin are compared, it is seen that a maximum point stress and the elastic modulus per unit density in a bending test, and the elastic modulus per unit density in a compression test are further improved in Examples than in Comparative Examples.

In addition, from FIGS. 1 to 3, it is seen that since in expanded molded articles of Comparative Examples 1a to 3a, fusion between expanded particles is insufficient, and many gaps exist between expanded particles, an appearance is deteriorated, while in expanded molded articles of Examples 1a to 6a, there are little gaps between expanded particles, and an appearance is good.

Example 1b (Resin Particles Production Step)

Polycarbonate-based resin particles (Panlite L-1250Y manufactured by Teijin Limited, density $1.20 \times 10^3$ kg/m$^3$) were dried at 120° C. for 4 hours. The resulting dried product was supplied to a single screw extruder having a bore diameter of 40 mm at a ratio of 10 kg/hr per hour to melt and knead the product at 290° C. Subsequently, the kneaded product was extruded into a chamber accommodating cooling water at about 10° C., from die holes (four nozzles having a diameter of 1.5 mm are arranged) of a die (temperature: 290° C., inlet side resin pressure: 13 MPa) mounted to a tip portion of a single screw extruder, a rotating shaft of a rotary blade having four cutting blades was rotated at a rotation number of 5000 rpm to cut the extruded product into particles, and thereby, the particles were cooled with the cooling water to prepare resin particles (average particle diameter 1.4 mm).

(Impregnation Step)

100 parts by weight of the above-mentioned resin particles were closed in a pressure vessel, the inside of the pressure vessel was substituted with a carbonic acid gas, and thereafter, a carbonic acid gas was pressed therein to an impregnation pressure of 2.0 MPa. The pressure vessel was left at rest under the environment at 20° C., and after a lapse of an impregnation time of 24 hours, the inside of the pressure vessel was slowly depressurized over 5 minutes. In this way, the resin particles were impregnated with a carbonic acid gas to obtain expandable particles. In addition, an impregnation amount of blowing agent at this time was 5.8% by weight.

(Expansion Step)

Immediately after depressurization in the above-mentioned impregnation step, the expandable particles were taken out from the pressure vessel, and thereafter, the above-mentioned impregnation product was expanded with water steam in an expansion tank at a high pressure, while stirring at an expansion temperature of 142° C. for 39 seconds using water steam. After expansion, drying was performed with an airstream drying machine to obtain expanded particles. When a bulk density of the resulting expanded particles was measured by the above-mentioned method, the bulk density was 109 kg/m$^3$ (bulk ratio 11.05 times).

(Molding Step)

The resulting expanded particles were allowed to stand at room temperature (23° C.) for one day, and thereafter, closed in a pressure vessel, the inside of the pressure vessel was substituted with a nitrogen gas, and thereafter, a nitrogen gas was pressed therein to an impregnation pressure (gauge pressure) of 1.0 MPa. The pressure vessel was left at rest under the environment at 20° C., and pressure aging was carried out for 24 hours. After taken out, the expanded particles were filled into a 30 mm×300 mm×400 mm molding die, heated with water steam at 0.85 MPa for 40 seconds, and then, cooled until a maximum surface pressure of an expanded molded article dropped to 0.05 MPa, and thereby, an expanded molded article having an expansion ratio of 11.45 times (density 105 kg/m$^3$) was obtained.

Example 2b

In the same manner as that of Example 1b except for the following conditions, expanded particles and an expanded molded article were obtained.
Impregnation pressure: 1.7 MPa
An impregnation amount of blowing agent: 5.6% by weight
Expansion time: 42 seconds Example 3b In the same manner as that of Example 1b except for the following conditions, expanded particles and an expanded molded article were obtained.
Impregnation pressure: 1.5 MPa
An impregnation amount of blowing agent: 5.0% by weight
Expansion time: 48 seconds Example 4b In the same manner as that of Example 1b except for the following conditions, expanded particles and an expanded molded article were obtained.
Impregnation pressure: 1.3 MPa
An impregnation amount of blowing agent: 4.5% by weight
Expansion time: 61 seconds Example 5b In the same manner as that of Example 1b except for the following conditions, expanded particles and an expanded molded article were obtained.
Impregnation pressure: 2.0 MPa
An impregnation amount of blowing agent: 5.8% by weight
Expansion temperature: 144° C.
Expansion time: 22 seconds Example 6b In the same manner as that of Example 1b except for the following conditions, expanded particles and an expanded molded article were obtained.
Impregnation pressure: 2.0 MPa
An impregnation amount of blowing agent: 5.6% by weight
Expansion time: 8 seconds Example 7b In the same manner as that of Example 1b except for the following conditions, expanded particles were obtained.
Polycarbonate-based resin: Panlite Z-2601 manufactured by Teijin Limited (density 1.2×10$^3$ kg/m$^3$)
Impregnation pressure: 2.0 MPa
An impregnation amount of blowing agent: 5.3% by weight
Expansion temperature: 144° C.
Expansion time: 21 seconds
In addition, in the same manner as that of Example 1b except that, as a molding step, a nitrogen gas was pressed therein to an impregnation pressure (gauge pressure) of 1.6 MPa, an expanded molded article was obtained.

Example 8b

In the same manner as that of Example 1b except for the following conditions, expanded particles were obtained.
Polycarbonate-based resin particles: Panlite K-1300Y manufactured by Teijin Limited (density 1.2×10$^3$ kg/m$^3$)
Impregnation pressure: 2.0 MPa
An impregnation amount of blowing agent: 5.5% by weight
Expansion temperature: 148° C.
Expansion time: 26 seconds
In addition, in the same manner as that of Example 1b except that, as a molding step, a nitrogen gas was pressed therein to an impregnation pressure (gauge pressure) of 1.6 MPa, an expanded molded article was obtained.

Example 9b

In the same manner as that of Example 1b except for the following conditions, expanded particles and an expanded molded article were obtained.

Polycarbonate-based resin particles: Wonderlite PC-110 manufactured by Chimei Corporation (density $1.2 \times 10^3$ kg/m$^3$)
Impregnation pressure: 2.0 MPa
An impregnation amount of blowing agent: 5.8% by weight
Expansion temperature: 139° C.
Expansion time: 41 seconds Comparative Example 1b In the same manner as that of Example 1b except for the following conditions, expanded particles and an expanded molded article were obtained.
Impregnation pressure: 4.0 MPa
An impregnation amount of blowing agent: 9.5% by weight
Expansion time: 8 seconds Comparative Example 2b In the same manner as that of Example 1b except for the following conditions, expanded particles and an expanded molded article were obtained.

Figure 4:
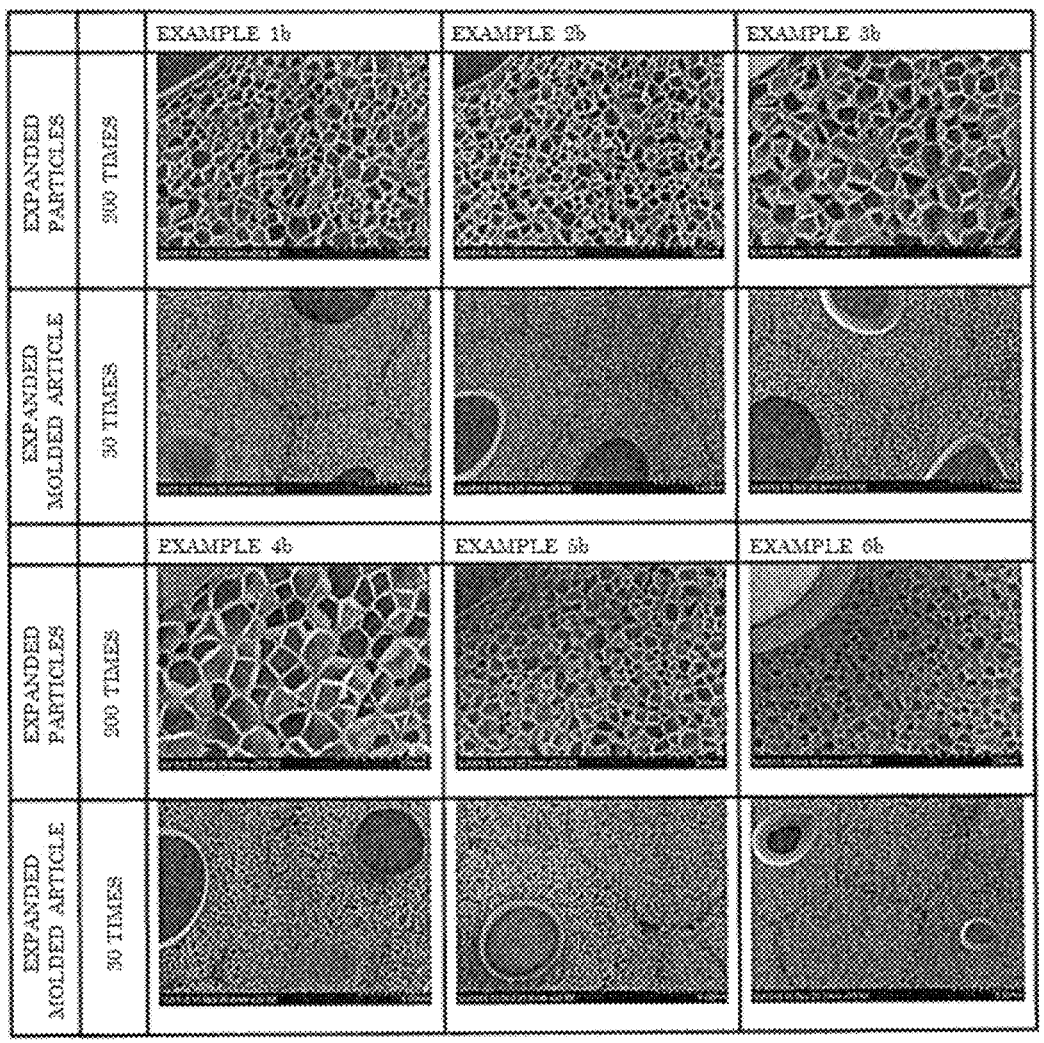
FIG. 4 is a photograph of cut sections of expanded particles and an expanded molded article of Examples 1b to 6b.
Figure 5:
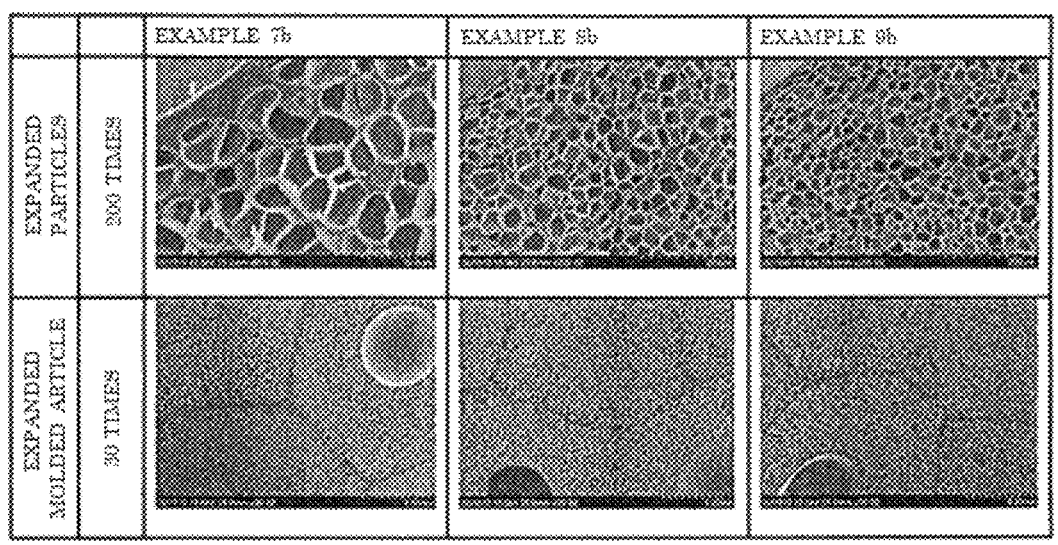
FIG. 5 is a photograph of cut sections of expanded particles and an expanded molded article of Examples 7b to 9b.
Figure 6:
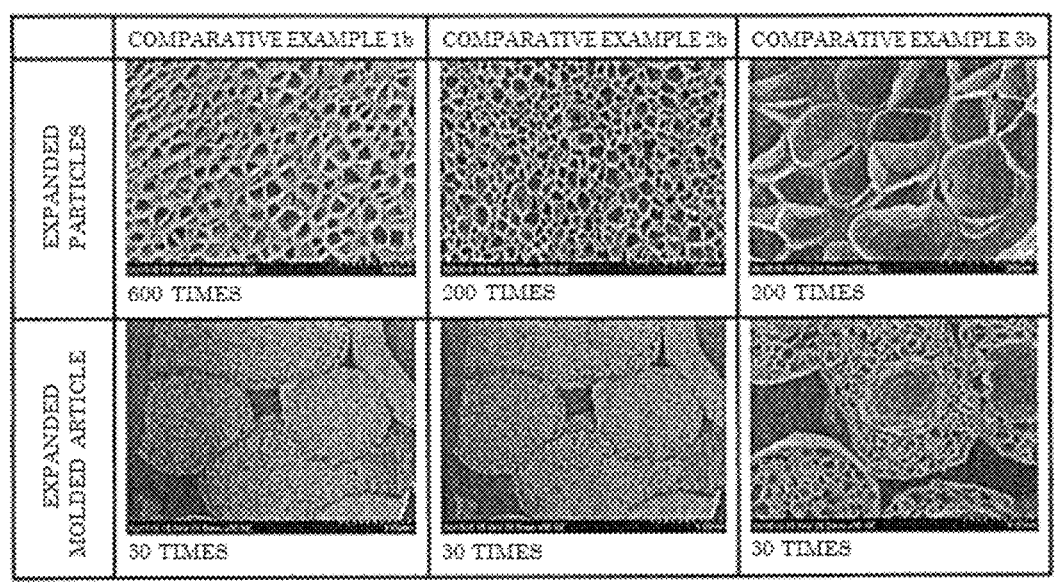
FIG. 6 is a photograph of cut sections of expanded particles and an expanded molded article of Comparative Examples 1b to 3b.

Polycarbonate-based resin particles: LEXAN 153 manufactured by SABIC Company (density $1.2 \times 10^3$ kg/m$^3$)
Impregnation pressure: 4.0 MPa
An impregnation amount of blowing agent: 9.9% by weight
Expansion time: 10 seconds Comparative Example 3b In the same manner as that of Example 1b except for the following conditions, expanded particles and an expanded molded article were obtained.
Impregnation pressure: 1.0 MPa
An impregnation amount of blowing agent: 3.5% by weight
Expansion time: 147 seconds
Various physical properties of expanded particles and expanded molded articles of Examples 1b to 9b and Comparative Examples 1b to 3b are shown in Tables 3 to 6.
In addition, photographs obtained by magnifying cut sections of expanded particles and expanded molded articles of Examples 1b to 9b and Comparative Examples 1b to 3b 30 to 600 times with a scanning electron microscope are shown in FIGS. 4 to 6.

TABLE 3

| | | Unit | Example | | | | | | | | |
| --- | --- | --- | --- | --- | --- | --- | --- | --- | --- | --- | --- |
| | | | 1b | 2b | 3b | 4b | 5b | 6b | 7b | 8b | 9b |
| Resin kind | | — | L-1250Y | | | | | | Z-2601 | K-1300Y | PC-110 |
| Impregnation amount of blowing agent | | % by weight | 5.8 | 5.6 | 5 | 4.5 | 5.8 | 5.6 | 5.3 | 5.5 | 5.8 |
| Expanded particles | Average cell diameter | μm | 44.58 | 41.01 | 62.75 | 81.37 | 57.3 | 30.6 | 38.8 | 52.15 | 56.96 |
| | Open cell rate | % | 1 | 2 | 0 | 0 | 0 | 0.2 | 0 | 1.3 | 0 |
| | Bulk ratio | Times | 11.05 | 10.84 | 12 | 11.7 | 15.1 | 5.38 | 8.5 | 10.3 | 12.1 |
| | Bulk density | kg/m$^3$ | 109 | 111 | 100 | 103 | 79 | 223 | 141 | 116 | 99 |
| | Apparent ratio | Times | 6.85 | 6.82 | 7.14 | 7.06 | 8.51 | 3.27 | 5.38 | 6.49 | 6.85 |
| | Average cell diameter/ Bulk ratio | μm/times | 4.03 | 3.78 | 5.23 | 6.95 | 3.79 | 5.69 | 4.56 | 5.05 | 4.71 |
| | Cell number density | Pieces/cm$^3$ | $1.3 \times 10^8$ | $1.6 \times 10^8$ | $4.7 \times 10^7$ | $2.1 \times 10^7$ | $7.6 \times 10^7$ | $1.5 \times 10^8$ | $1.4 \times 10^8$ | $7.4 \times 10^7$ | $6.0 \times 10^7$ |
| | Average cell wall thickness | μm | 2.41 | 2.23 | 3.24 | 4.25 | 2.44 | 3.96 | 2.75 | 2.99 | 3.08 |

TABLE 4

| | | Unit | Comparative Example | | |
| --- | --- | --- | --- | --- | --- |
| | | | 1b | 2b | 3b |
| Resin kind | | — | L-1250Y | 153 | L-1250Y |
| Impregnation amount of blowing agent | | % by weight | 9.5 | 9.9 | 3.5 |
| Expanded particles | Average cell diameter | μm | 18.01 | 38.9 | 133.85 |
| | Open cell rate | % | 10.2 | 18.02 | 0.92 |
| | Bulk ratio | Times | 9.91 | 19.5 | 10.39 |
| | Bulk density | kg/m$^3$ | 121 | 62 | 115 |
| | Apparent ratio | Times | 6.2 | 12.4 | 6.09 |
| | Average cell diameter/Bulk ratio | μm/times | 1.82 | 1.99 | 12.88 |
| | Cell number density | Pieces/cm$^3$ | $1.7 \times 10^9$ | $3.7 \times 10^8$ | $4.1 \times 10^6$ |
| | Average cell wall thickness | μm | 1.09 | 1.11 | 8.25 |

TABLE 5

| | | Unit | Example | | | | | | | | |
| --- | --- | --- | --- | --- | --- | --- | --- | --- | --- | --- | --- |
| | | | 1b | 2b | 3b | 4b | 5b | 6b | 7b | 8b | 9b |
| Expanded molded article | Average cell diameter | μm | 54.92 | 55.65 | 66.26 | 99.39 | 66.26 | 40.06 | 60.70 | 64.2 | 64.2 |
| | Open cell rate | % | 7.1 | 14.2 | 17.6 | 39.4 | 12.5 | 3.9 | 17.6 | 14.4 | 6.0 |
| | Expansion ratio (condition A) | Times | 11.45 | 12.44 | 13.30 | 13.34 | 13.44 | 5.10 | 11.60 | 11.38 | 11.83 |

TABLE 5-continued

| | | Unit | Example 1b | 2b | 3b | 4b | 5b | 6b | 7b | 8b | 9b |
|---|---|---|---|---|---|---|---|---|---|---|---|
| | Density | kg/m$^3$ | 105 | 96 | 90 | 90 | 89 | 236 | 103 | 105 | 101 |
| | Average cell diameter/ Expansion ratio | μm/ times | 4.80 | 4.47 | 4.98 | 7.45 | 4.93 | 7.86 | 5.23 | 5.64 | 5.43 |
| | Cell number density | Pieces/ cm$^3$ | 1.20 × 10$^8$ | 1.27 × 10$^8$ | 8.08 × 10$^7$ | 2.4 × 10$^7$ | 8.17 × 10$^7$ | 1.22 × 10$^8$ | 9.05 × 10$^7$ | 7.48 × 10$^7$ | 7.81 × 10$^7$ |
| | Average cell wall thickness | μm | 1.70 | 1.58 | 1.75 | 2.62 | 1.73 | 3.03 | 1.85 | 2.00 | 1.92 |
| Bending test | Maximum point stress | MPa | 1.87 | 1.47 | 1.38 | 1.04 | 1.29 | 6.26 | 1.4 | 1.31 | 1.83 |
| | Maximum point stress (per unit density) | MPa/ (kg/m$^3$) | 0.0178 | 0.0153 | 0.0153 | 0.0116 | 0.0144 | 0.0266 | 0.0135 | 0.0124 | 0.0180 |
| | Elastic modulus | MPa | 36.26 | 26.32 | 24.03 | 19.54 | 28.40 | 130.3 | 25.96 | 23.96 | 37.19 |
| | Elastic modulus (per unit density) | MPa/ (kg/m$^3$) | 0.346 | 0.273 | 0.266 | 0.217 | 0.318 | 0.553 | 0.251 | 0.227 | 0.367 |
| Compression test | Elastic modulus | MPa | 31.32 | 24.59 | 22.91 | 16.96 | 24.40 | 111.44 | 17.44 | 20.49 | 33.13 |
| | Elastic modulus (per unit density) | MPa/ (kg/m$^3$) | 0.299 | 0.255 | 0.254 | 0.188 | 0.273 | 0.473 | 0.169 | 0.194 | 0.327 |

TABLE 6

| | | | Unit | Comparative Example 1b | 2b | 3b |
|---|---|---|---|---|---|---|
| Expanded molded article | | Average cell diameter | μm | 17 | 20.51 | 193.81 |
| | | Open cell rate | % | 70.7 | 20.5 | 88.9 |
| | | Expansion ratio (condition A) | Times | 6.83 | 14.76 | 5.64 |
| | | Density | kg/m$^3$ | 176 | 81 | 213 |
| | | Average cell diameter/Expansion ratio | μm/times | 2.49 | 1.39 | 34.37 |
| | | Cell number density | Pieces/cm$^3$ | 2.26 × 10$^9$ | 3.05 × 10$^9$ | 1.2 × 10$^6$ |
| | | Average cell wall thickness | μm | 0.92 | 0.49 | 13.03 |
| | Bending test | Maximum point stress | MPa | 1.11 | 0.69 | 1.34 |
| | | Maximum point stress (per unit density) | MPa/ (kg/m$^3$) | 0.0063 | 0.0084 | 0.0063 |
| | | Elastic modulus | MPa | 22.62 | 17.27 | 28.71 |
| | | Elastic modulus (per unit density) | MPa/ (kg/m$^3$) | 0.129 | 0.212 | 0.135 |
| | Compression test | Elastic modulus | MPa | 16.43 | 8.50 | 22.45 |
| | | Elastic modulus (per unit density) | MPa/ (kg/m$^3$) | 0.093 | 0.104 | 0.105 |

From the above-mentioned Tables 3 to 6, it is seen that by regulating a bulk ratio and an average cell diameter to specified ranges, an expanded molded article having a high mechanical strength is obtained.

In addition, from FIGS. 4 to 6, it is seen that since in expanded molded articles of Comparative Examples 1b to 3b, fusion between expanded particles is insufficient, and many gaps exist between expanded particles, an appearance is deteriorated, while in expanded molded articles of Examples 1b to 9b, there are little gaps between expanded particles, and an appearance is good.

Example 1c (Resin Particles Production Step)

Polycarbonate-based resin particles (Panlite L-1250Y manufactured by Teijin Limited, density 1.20×10$^3$ kg/m$^3$) were dried at 120° C. for 4 hours. The resulting dried product was supplied to a single screw extruder having a bore diameter of 40 mm at a ratio of 10 kg/hr per hour to melt and knead the product at 290° C. Subsequently, the kneaded product was extruded in a chamber accommodating cooling water at about 10° C., from die holes (four nozzles having a diameter of 1.5 mm are arranged) of a die (temperature: 290° C., inlet side resin pressure: 13 MPa) mounted to a tip portion of a single screw extruder, a rotating shaft of a rotary blade having four cutting blades was rotated at a rotation number of 5000 rpm to cut the extruded product into particles, and thereby, the particles were cooled with the cooling water to prepare resin particles (average particle diameter 1.4 mm).

(Impregnation Step)

100 parts by weight of the above-mentioned resin particles were closed in a pressure vessel, the inside of the pressure vessel was substituted with a carbonic acid gas, and thereafter, a carbonic acid gas was pressed therein to an impregnation pressure of 2.0 MPa. The pressure vessel was left at rest under the environment at 20° C., and after a lapse of an impregnation time of 24 hours, the inside of the pressure vessel was slowly depressurized over 5 minutes. In this way, the resin particles were impregnated with a carbonic acid gas to obtain expandable particles.

(Expansion Step)

Immediately after depressurization in the above-mentioned impregnation step, the expandable particles were taken out from the pressure vessel, and thereafter, the above-mentioned impregnation product was expanded with water steam in an expansion tank at a high pressure, while stirring at an expansion temperature of 136° C. for 54 seconds using water steam. After expansion, drying was carried out in an airstream drying machine to obtain expanded particles.
(Molding Step)

The resulting expanded particles were allowed to stand at room temperature (23° C.) for one day, and thereafter, closed in a pressure vessel, the inside of the pressure vessel was substituted with a nitrogen gas, and thereafter, a nitrogen gas was pressed therein to an impregnation pressure (gauge pressure) of 1.0 MPa. This was left at rest under the environment at 20° C., and pressure aging was carried out for 24 hours. After taken out, the expanded particles were filled into a 30 mm×300 mm×400 mm molding die, heated with water steam at 0.85 MPa for 40 seconds, and then, cooled until a maximum surface pressure of an expanded molded article dropped to 0.05 MPa, and thereby, an expanded molded article having an expansion ratio of about 14 times was obtained.

Example 2c

In the same manner as that of Example 1c except that an expansion time of an expansion step was 8 seconds, and an expansion ratio of an expanded molded article was about 5 times, expanded particles and an expanded molded article were obtained.

Example 3c

In the same manner as that of Example 1c except that polycarbonate-based resin particles (Panlite Z-2601 manufactured by Teijin Limited, density $1.20 \times 10^3$ kg/m$^3$) were used, an expansion temperature of an expansion step was 144° C., an expansion time was 31 seconds, an impregnation pressure (gauge pressure) of a molding step was 1.6 MPa, and an expansion ratio of an expanded molded article was about 10 times, expanded particles and an expanded molded article were obtained.

Examples 4c

In the same manner as that of Example 1c except that polycarbonate-based resin particles (LEXAN 153 manufactured by SABIC Company, density $1.20 \times 10^3$ kg/m$^3$) were used, an expansion temperature of an expansion step was 141° C., an expansion time was 59 seconds, and an expansion ratio of an expanded molded article was about 12 times, expanded particles and an expanded molded article were obtained.

Example 5c

In the same manner as that of Example 1c except that polycarbonate-based resin particles (LEXAN 101R manufactured by SABIC Company, density $1.20 \times 10^3$ kg/m$^3$) were used, an expansion temperature of an expansion step was 139° C., an expansion time was 28 seconds, and an expansion ratio of an expanded molded article was about 13 times, expanded particles and an expanded molded article were obtained.

Example 6c

In the same manner as that of Example 1c except that polycarbonate-based resin particles (Panlite K-1300Y manufactured by Teijin Limited, density $1.20 \times 10^3$ kg/m$^3$) were used, an expansion temperature of an expansion step was 148° C., an expansion time was 26 seconds, an impregnation pressure (gauge pressure) of a molding step was 1.6 MPa, and an expansion ratio of an expanded molded article was about 11 times, expanded particles and an expanded molded article were obtained.

Example 7c

In the same manner as that of Example 1c except that polycarbonate-based resin particles (Wonderlite PC-110 manufactured by Chimei Corporation, density $1.20 \times 10^3$ kg/m$^3$) were used, an expansion temperature of an expansion step was 141° C., an expansion time was 41 seconds, and an expansion ratio of an expanded molded article was about 12 times, expanded particles and an expanded molded article were obtained.

Example 8c

In the same manner as that of Example 1c except that polycarbonate-based resin particles (Panlite L-1250Y manufactured by Teijin Limited, density $1.20 \times 10^3$ kg/m$^3$) were used, an expansion temperature of an expansion step was 136° C., an expansion time was 39 seconds, and an expansion ratio of an expanded molded article was about 11 times, expanded particles and an expanded molded article were obtained.

Comparative Example 1c

According the same manner as that of Example 1c except that polycarbonate-based resin particles (LEXAN 153 manufactured by SABIC Company, density $1.20 \times 10^3$ kg/m$^3$) were used, an impregnation pressure of an impregnation step was 4.0 MPa, 0.3 part by weight of calcium carbonate as a bonding preventing agent was mixed based on 100 parts by weight of a polycarbonate-based resin immediately after taking out of expandable particles, an expansion time of an expansion step was 120 seconds, and heating was performed for 60 seconds at a water steam pressure of 0.35 MPa in a molding step, expanded particles and an expanded molded article were obtained.

Comparative Example 2c (1) Preparation of PET Expanded Particles

95% by weight of a polyethylene terephthalate (PET) resin (MITSUI PET SA-135 manufactured by Mitsui Chemicals, Inc.), 5% by weight of a polyethylene naphthalate (PEN) resin (Teonex TN8050SC manufactured by Teijin Limited), 1.8% by weight of a cell adjusting agent (PET-F40-1 manufactured by TERABO LTD.), and 0.24% by weight of a crosslinking agent (pyromellitic dianhydride manufactured by Daicel Corporation) were supplied to a single screw extruder having a bore diameter of 65 mm and a L/D ratio of 35, to melt and knead them at 290° C. Subsequently, butane consisting of 35% by weight of isobutane and 65% by weight of normal butane was pressed into a resin composition in the melted state, from the middle of an extruder, so that an amount thereof became 0.5 part by weight relative to a total amount of 100 parts by weight of the PET resin and the PEN resin, and uniformly dispersed in the resin composition. Thereafter, at a front end part of the extruder, the resin composition in the melted state was cooled to 250° C., and thereafter, the resin composition was extruded from each nozzle of a multi-nozzle die attached to a front end of the extruder, and expanded.

(2) Preparation of Expanded Molded Article

An in-die expansion molding machine provided with a die (male die and female die) was prepared. In the state where the male die and the female die were clamped, a rectangular parallelepiped cavity having an internal dimension of length 300 mm×width 400 mm×height 30 mm was formed between female and male dies.

Then, expanded particles were filled into the die in the state where the die cracking was taken by 3 mm, thereafter, water steam was introduced from the female die for 30 minutes so that a pressure of the inside of the cavity became 0.05 MPa (gauge pressure), then, water steam was introduced from the male die for 30 seconds so that a pressure of the inside of the cavity became 0.05 MPa (gauge pressure), then, water steam was supplied from both male and female dies for 30 seconds so that a pressure of the inside of the cavity became 0.1 MPa (gauge pressure), and the expanded particles were heated and secondarily expanded to thermally fuse and integrate secondary expanded particles. Thereafter, this was retained for 900 seconds in the state where introduction of water steam into the cavity was stopped (heat-retaining step), finally, cooling water was supplied into the cavity to cool an expanded molded article in the die, and thereafter, the cavity was opened to take out an expanded molded article. At that time, the time required for obtaining an expanded molded article from a step of filling expanded particles into the die (molding cycle time) was 1200 seconds.

Comparative Example 3c 100 parts by weight of an ethylene-propylene random copolymer and 0.10 part by weight of a zinc borate powder (cell adjusting agent) were supplied to an extruder, and heated, melted, and kneaded to form a first melted resin for forming a core layer. At the same time, an ethylene-propylene random copolymer was supplied to another extruder, and heated, melted, and kneaded to form a second melted resin for forming a covering layer.

Next, the first melted resin for forming a core layer and second melted resin for forming a covering layer were supplied to a coextrusion die, and in the die, the second melted resin was laminated on the first melted resin so that the second melted resin covered the periphery of a strand of the first melted resin.

Next, the laminated melted resin was extruded in the shape of a strand from the coextrusion die, and cut so that a diameter was about 1 mm, and a length became approximately 1.8 times of a diameter, to obtain multilayer resin particles having an average weight per one particle of 1.8 mg.

Using the multilayer resin particles, expanded particles were produced as described below.

100 parts by weight (1000 g) of the multilayer resin particles, 300 parts by weight of water, 0.05 part by weight of sodium dodecylbenzenesulfonate (surfactant), and 0.3 part by weight of kaolin (dispersant), and a carbonic acid gas (blowing agent) were added to a 5 liters autoclave, a temperature was raised to a temperature that is lower than an expansion temperature by 5° C., while stirring, and this was retained at that temperature for 15 minutes. Then, a temperature was raised to an expansion temperature, and this was retained at the same temperature for 15 minutes. Then, one end of the autoclave was opened to discharge the autoclave content under an atmospheric pressure, to obtain expanded particles.

In addition, discharge was carried out while a carbonic gas was supplied into the autoclave, so that a pressure in the autoclave kept a pressure in the autoclave immediately before discharge, during discharge of the multilayer resin particles from the autoclave.

Using the resulting expanded particles, an expanded particle molded article was molded as described below. Using, as a molding machine, a small scale molding machine that can stand a saturated water steam pressure of 0.48 MPa (G), the expanded particles were filled into a die having a molding space of 250 mm×200 mm×50 mm, in the state where the die was not completely closed, and a gap (about 5 mm) was provided, then, the die was completely clamped, the air in the die was discharged by a water steam pressure, thereafter, water steam at 0.42 MPa was supplied into the die, and thereby, heating and molding were performed. After heating and molding, this was cooled with water until a surface pressure of a molded article in the die became 0.039 MPa, thereafter, an expanded molded article was taken out from the die, aged at 80° C. for 24 hours, and thereafter, cooled to room temperature.

Various physical properties of expanded molded articles of Examples 1c to 8c and Comparative Examples 1c to 3c are shown in Table 7. In Table 7, PC represents a polycarbonate-based resin, PET represents a polyester-based resin, and PP represents a propylene-based resin.

TABLE 7

| | | | Example | | | | | |
|---|---|---|---|---|---|---|---|---|
| | Unit | Temperature | 1c | 2c | 3c | 4c | 5c | 6c |
| | Resin kind | | PC | PC | PC | PC | PC | PC |
| Expansion | Times | −40° C. | 14 | 5 | 10 | 12 | 13 | 11 |
| ratio | | 23° C. | 14 | 5 | 10 | 12 | 13 | 11 |
| (condition B) | | 80° C. | 15 | 5 | 10 | 13 | 13 | 11 |
| | | 140° C. | 14 | 5 | 10 | 12 | 12 | 11 |
| Density | kg/m³ | −40° C. | 85 | 236 | 119 | 104 | 93 | 105 |
| | | 23° C. | 83 | 236 | 117 | 102 | 96 | 106 |
| | | 80° C. | 82 | 248 | 118 | 92 | 94 | 106 |
| | | 140° C. | 88 | 241 | 118 | 99 | 99 | 107 |
| Maximum point | MPa | −40° C. | 1.36(36) | 7.78(32) | 2.57(34) | 2.28(44) | 1.97(31) | 1.50(29) |
| stress of | | 23° C. | 0.99(1) | 6.26(6) | 2.06(7) | 1.84(16) | 1.66(11) | 1.31(13) |
| bending test | | 80° C. | 0.90(10) | 5.67(4) | 1.82(5) | 1.25(21) | 1.40(7) | 1.10(5) |
| Inside of ( ) is | | 140° C. | 0.73(27) | 3.87(34) | 1.21(37) | 0.96(39) | 0.95(37) | 0.73(37) |
| variability | | Average | 1.00 | 5.90 | 1.92 | 1.58 | 1.50 | 1.16 |
| rate % | | Variability rate X % | 36 | 34 | 37 | 44 | 37 | 37 |
| Maximum point | MPa/ | −40° C. | 0.016(33) | 0.033(32) | 0.022(38) | 0.022(38) | 0.021(31) | 0.014(27) |

TABLE 7-continued

|  |  |  | | | | | |
|---|---|---|---|---|---|---|---|
| stress of bending test per unit density Inside of ( ) is variability rate % | (kg/m³) | 23° C. | 0.012(0) | 0.027(8) | 0.018(13) | 0.018(13) | 0.017(6) | 0.012(9) |
|  |  | 80° C. | 0.011(8) | 0.023(8) | 0.015(6) | 0.014(13) | 0.015(6) | 0.010(9) |
|  |  | 140° C. | 0.008(33) | 0.016(36) | 0.010(38) | 0.010(38) | 0.010(38) | 0.007(36) |
|  |  | Average | 0.012 | 0.025 | 0.016 | 0.016 | 0.016 | 0.011 |
|  |  | Variability rate Y % | 33 | 36 | 38 | 38 | 38 | 36 |
| Open cell rate | % |  | 20.6 | 3.9 | 9.0 | 8.9 | 11.0 | 14.4 |

|  |  |  | Example | | Comparative Example | | |
|---|---|---|---|---|---|---|---|
|  | Unit | Temperature | 7c | 8c | 1c | 2c | 3c |
|  |  | Resin kind | PC | PC | PC | PET | PP |
| Expansion ratio (condition B) | Times | −40° C. | 12 | 11 | 11 | 9 | 20 |
|  |  | 23° C. | 12 | 11 | 13 | 9 | 20 |
|  |  | 80° C. | 12 | 11 | 12 | 9 | 20 |
|  |  | 140° C. | 12 | 11 | 12 | 9 | 20 |
| Density | kg/m³ | −40° C. | 102 | 105 | 106 | 153 | 46 |
|  |  | 23° C. | 101 | 105 | 95 | 153 | 45 |
|  |  | 80° C. | 103 | 105 | 97 | 143 | 45 |
|  |  | 140° C. | 100 | 105 | 97 | 149 | 45 |
| Maximum point stress of bending test Inside of ( ) is variability rate % | MPa | −40° C. | 2.35(43) | 2.33(37) | 1.25 | 1.80(54) | 0.95 |
|  |  | 23° C. | 1.83(12) | 1.87(10) | 0.66 | 1.54(32) | 0.49 |
|  |  | 80° C. | 1.54(6) | 1.55(9) | 0.68 | 1.03(12) | 0.18 |
|  |  | 140° C. | 0.85(48) | 1.03(39) | (*) | 0.32(73) | (*) |
|  |  | Average | 1.64 | 1.70 | (*) | 1.17 | (*) |
|  |  | Variability rate X % | 48 | 39 | (*) | 73 | (*) |
| Maximum point stress of bending test per unit density Inside of ( ) is variability rate % | MPa/ (kg/m³) | −40° C. | 0.023(44) | 0.022(38) | 0.012 | 0.012(50) | 0.021 |
|  |  | 23° C. | 0.018(13) | 0.018(13) | 0.007 | 0.010(25) | 0.011 |
|  |  | 80° C. | 0.015(6) | 0.015(6) | 0.007 | 0.007(13) | 0.004 |
|  |  | 140° C. | 0.009(44) | 0.010(38) | (*) | 0.002(75) | (*) |
|  |  | Average | 0.016 | 0.016 | (*) | 0.008 | (*) |
|  |  | Variability rate Y % | 44 | 38 | (*) | 75 | (*) |
| Open cell rate | % |  | 6.0 | 7.1 | 18.0 | 6.9 | 10.1 |

(*) represents that measurement could not be performed due to melting or deformation of a test piece.

From the above-mentioned Table 7, it is seen that in expanded molded articles of Examples 1c to 8c, a variation of a mechanical strength is further suppressed even when an environmental temperature changes. On the other hand, it is seen that in expanded molded articles of Comparative Examples 1c to 3c, a variation is large, or the expanded molded articles themselves are melted or deformed.

In addition, regarding a maximum point stress of a bending test, a value obtained by calculating stress change between at −40° C. and 23° C. is shown in Table 8. Stress change means [(maximum point stress of bending test at −40° C.)−(maximum point stress of bending test at 23° C.)]÷(maximum point stress of bending test at 23° C.).

TABLE 8

| Stress change | Example | | | | | | | | Comparative Example | | |
|---|---|---|---|---|---|---|---|---|---|---|---|
|  | 1c | 2c | 3c | 4c | 5c | 6c | 7c | 8c | 1c | 2c | 3c |
| −40° C.-23° C. | 0.37 | 0.24 | 0.25 | 0.24 | 0.19 | 0.15 | 0.28 | 0.25 | 0.89 | 0.17 | 0.94 |

In addition, regarding a maximum point stress of a bending test, a value obtained by calculating stress change between 80° C. and 23° C. is shown in Table 9. Stress change means [(maximum point stress of bending test at 23° C.)−(maximum point stress of bending teat at 80° C.)]÷(maximum point stress of bending test at 23° C.).

TABLE 9

| Stress change | Example | | | | | | | | Comparative Example | | |
|---|---|---|---|---|---|---|---|---|---|---|---|
|  | 1c | 2c | 3c | 4c | 5c | 6c | 7c | 8c | 1c | 2c | 3c |
| 80° C.-23° C. | 0.09 | 0.09 | 0.12 | 0.32 | 0.16 | 0.16 | 0.16 | 0.17 | −0.03 | 0.33 | 0.63 |

Also from the above-mentioned Tables 8 and 9, it is seen that in expanded molded articles of Examples 1c to 8c, a variation of a mechanical strength is further suppressed even when an environmental temperature changes, as compared with expanded molded articles of Comparative Examples 1c to 3c.

What is claimed is:

1. Expanded particles comprising a polycarbonate-based resin as a base resin,
wherein when an average cell diameter of said expanded particles is divided by a bulk ratio of said expanded particles, said expanded particles have a value within a range of 3.0 to 10.0 μm/times,
wherein said average cell diameter is 20 to 200 μm,
said bulk ratio is 2 to 20 times, and
said expanded particles show a cell number density of $1.0 \times 10^7$ to $7.6 \times 10^7$ pieces/cm$^3$.

2. The expanded particles according to claim 1, wherein said expanded particles have an open cell rate of 0 to 10%.

3. An expanded molded article obtained from the expanded particles according to claim 1.

4. Expanded particles comprising a polycarbonate-based resin as a base resin, wherein said expanded particles have (i) a cell density X of $1.0 \times 10^7$ pieces/cm$^3$ or more and less than $7.6 \times 10^7$ pieces/cm$^3$ where the cell density X is calculated by the following expression: cell density $X = (\rho/D - 1)/\{(4/3) \times \pi \times (C/10000/2)^3\}$ wherein C represents an average cell diameter (μm), ρ represents the density (kg/m$^3$) of a polycarbonate-based resin, and D represents an apparent density (kg/m$^3$) of expanded particles, and (ii) an average cell wall thickness of 1 to 15 μm, wherein said average cell diameter C is 20 to 200 μm, said expanded particles have a bulk ratio of 2 to 20 times, and wherein when said average cell diameter of said expanded particles is divided by said bulk ratio of said expanded particles, said expanded particles have a value within a range of 3.0 to 10.0 μm/times.

5. The expanded particles according to claim 4, wherein said expanded particles have an apparent density of 20 to 640 kg/m$^3$.

6. The expanded particles according to claim 4, wherein said density of a polycarbonate-based resin is $1.0 \times 10^3$ to $1.4 \times 10^3$ kg/m$^3$.

7. An expanded molded article obtained from the expanded particles according to claim 4.

8. An expanded molded article obtained from a plurality of expanded particles comprising a polycarbonate-based resin as a base resin, wherein when a value of a maximum point stress of a bending test at four points is measured at each temperature of −40° C., 23° C., 80° C., and 140° C., and an average of said value of a maximum point stress of a bending test at four points is calculated, said expanded molded article shows a variability rate of said value of a maximum point stress of a bending test at four points to said average within a range of 0 to 50%, and wherein said expanded particles have an average cell diameter of 20 to 200 μm and a bulk ratio of 2 to 20 times, wherein when said average cell diameter of said expanded particles is divided by said bulk ratio of said expanded particles, said expanded particles have a value within a range of 3.0 to 10.0 μm/times, and said expanded particles show a cell number density of $1.0 \times 10^7$ pieces/cm$^3$ or more and less than $7.6 \times 10^7$ pieces/cm$^3$.

9. The expanded molded article according to claim 8, wherein said expanded molded article has an open cell rate of 0 to 50%.

10. The expanded molded article according to claim 8, wherein said expanded molded article has an expansion ratio of 3 to 30 times.

11. The expanded molded article according to claim 8, wherein when "maximum point stress of bending test/density" at four points is calculated by dividing said values of four points of a maximum point stress of a bending test by the density of said expanded molded article, respectively, and an average of said "maximum point stress of bending test/density" at four points is calculated, said expanded molded article shows a variability rate of said value of "maximum point stress of bending test/density" at four points to said average within a range of 0 to 50%.

12. The expanded molded article according to claim 8, wherein said polycarbonate-based resin shows MFR of 1.0 to 15.0 g/10 min.

13. The expanded molded article according to claim 8, wherein said "maximum point stress of bending test" at −40° C. changes within a range of 0 to 0.88, to said "maximum point stress of bending test" at 23° C.

* * * * *